US010778656B2

(12) United States Patent
Li et al.

(10) Patent No.: US 10,778,656 B2
(45) Date of Patent: *Sep. 15, 2020

(54) SHARING RESOURCES ACROSS MULTIPLE DEVICES IN ONLINE MEETINGS

(71) Applicant: Cisco Technology, Inc., San Jose, CA (US)

(72) Inventors: Siyuan Li, Hangzhou (CN); Bingjun Lv, Hangzhou (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,364

(22) Filed: May 13, 2019

(65) Prior Publication Data

US 2019/0268314 A1 Aug. 29, 2019

Related U.S. Application Data

(63) Continuation of application No. 14/460,143, filed on Aug. 14, 2014, now Pat. No. 10,291,597.

(51) Int. Cl.
*H04L 29/06* (2006.01)
*H04L 29/08* (2006.01)

(52) U.S. Cl.
CPC .......... *H04L 63/0442* (2013.01); *H04L 63/10* (2013.01); *H04L 65/4038* (2013.01); *H04L 67/148* (2013.01)

(58) Field of Classification Search
CPC . H04L 63/0442; H04L 63/10; H04L 65/4038; H04L 67/148
See application file for complete search history.

(56) References Cited

U.S. PATENT DOCUMENTS 4,460,807 A 7/1984 Kerr et al.
4,890,257 A 12/1989 Anthias et al.
(Continued)

FOREIGN PATENT DOCUMENTS

CN 101055561 10/2007
CN 101076060 11/2007
(Continued)

OTHER PUBLICATIONS

"Cisco Webex Meetings for iPad and iPhone Release Notes Version 5.0" Oct. 2013 (5 pages) http://www.yoipinfo.net/docs/cisco/Cisco_WebEx_Meetings_iPad_iPhone_relnotes_y5_0.pdf.
(Continued)

*Primary Examiner* — Joseph P Hirl
*Assistant Examiner* — Thomas A Gyorfi
(74) *Attorney, Agent, or Firm* — Polsinelli PC

(57) ABSTRACT

The subject disclosure relates to methods of sharing resources across multiple devices in online meetings. A server manages an online meeting, in which a first client device, a second client device, and a third client device participate. The first client device is a primary device associated with a first user, the second client device is a secondary device associated with the first user, and the third client device is associated with a second user. The server receives from the first client device a command for the second client device to share a resource with the third client device. The server forwards the command to the second device. Next, the server receives data associated with the resource, the data being sent from the second client device in response to the command. The server then forwards the data to the third client device. Systems and computer readable media are also provided.

15 Claims, 11 Drawing Sheets

(56) References Cited

U.S. PATENT DOCUMENTS

| | | |
|---|---|---|
| 4,977,605 A | 12/1990 | Fardeau et al. |
| 5,293,430 A | 3/1994 | Shiau et al. |
| 5,694,563 A | 12/1997 | Belfiore et al. |
| 5,699,082 A | 12/1997 | Marks et al. |
| 5,745,711 A | 4/1998 | Kitahara et al. |
| 5,767,897 A | 6/1998 | Howell |
| 5,825,858 A | 10/1998 | Shaffer et al. |
| 5,874,962 A | 2/1999 | de Judicibus et al. |
| 5,889,671 A | 3/1999 | Autermann et al. |
| 5,917,537 A | 6/1999 | Lightfoot et al. |
| 5,995,096 A | 11/1999 | Kitahara et al. |
| 6,023,606 A | 2/2000 | Monte et al. |
| 6,040,817 A | 3/2000 | Sumikawa |
| 6,075,531 A | 6/2000 | DeStefano |
| 6,085,166 A | 7/2000 | Beckhardt et al. |
| 6,191,807 B1 | 2/2001 | Hamada et al. |
| 6,300,951 B1 | 10/2001 | Filetto et al. |
| 6,392,674 B1 | 5/2002 | Hiraki et al. |
| 6,424,370 B1 | 7/2002 | Courtney |
| 6,463,473 B1 | 10/2002 | Gubbi |
| 6,553,363 B1 | 4/2003 | Hoffman |
| 6,554,433 B1 | 4/2003 | Holler |
| 6,573,913 B1 | 6/2003 | Butler et al. |
| 6,646,997 B1 | 11/2003 | Baxley et al. |
| 6,665,396 B1 | 12/2003 | Khouri et al. |
| 6,700,979 B1 | 3/2004 | Washiya |
| 6,711,419 B1 | 3/2004 | Mori |
| 6,754,321 B1 | 6/2004 | Innes et al. |
| 6,754,335 B1 | 6/2004 | Shaffer et al. |
| RE38,609 E | 10/2004 | Chen et al. |
| 6,816,464 B1 | 11/2004 | Scott et al. |
| 6,865,264 B2 | 3/2005 | Berstis |
| 6,938,208 B2 | 8/2005 | Reichardt |
| 6,978,499 B2 | 12/2005 | Gallant et al. |
| 7,046,134 B2 | 5/2006 | Hansen |
| 7,046,794 B2 | 5/2006 | Piket et al. |
| 7,058,164 B1 | 6/2006 | Chan et al. |
| 7,058,710 B2 | 6/2006 | McCall et al. |
| 7,062,532 B1 | 6/2006 | Sweat et al. |
| 7,085,367 B1 | 8/2006 | Lang |
| 7,124,164 B1 | 10/2006 | Chemtob |
| 7,149,499 B1 | 12/2006 | Oran et al. |
| 7,180,993 B2 | 2/2007 | Hamilton |
| 7,209,475 B1 | 4/2007 | Shaffer et al. |
| 7,340,151 B2 | 3/2008 | Taylor et al. |
| 7,366,310 B2 | 4/2008 | Stinson et al. |
| 7,418,664 B2 | 8/2008 | Ben-Shachar et al. |
| 7,441,198 B2 | 10/2008 | Dempski et al. |
| 7,478,339 B2 | 1/2009 | Pettiross et al. |
| 7,500,200 B2 | 3/2009 | Kelso et al. |
| 7,530,022 B2 | 5/2009 | Ben-Shachar et al. |
| 7,552,177 B2 | 6/2009 | Kessen et al. |
| 7,577,711 B2 | 8/2009 | McArdle |
| 7,584,258 B2 | 9/2009 | Maresh |
| 7,587,028 B1 | 9/2009 | Broerman et al. |
| 7,606,714 B2 | 10/2009 | Williams et al. |
| 7,606,862 B2 | 10/2009 | Swearingen et al. |
| 7,620,902 B2 | 11/2009 | Manion et al. |
| 7,634,533 B2 | 12/2009 | Rudolph et al. |
| 7,774,407 B2 | 8/2010 | Daly et al. |
| 7,792,277 B2 | 9/2010 | Shaffer et al. |
| 7,830,814 B1 | 11/2010 | Allen et al. |
| 7,840,013 B2 | 11/2010 | Dedieu et al. |
| 7,840,980 B2 | 11/2010 | Gutta |
| 7,881,450 B1 | 2/2011 | Gentle et al. |
| 7,920,160 B2 | 4/2011 | Tamaru et al. |
| 7,956,869 B1 | 6/2011 | Gilra |
| 7,986,372 B2 | 7/2011 | Ma et al. |
| 7,995,464 B1 | 8/2011 | Croak et al. |
| 8,059,557 B1 | 11/2011 | Sigg et al. |
| 8,081,205 B2 | 12/2011 | Baird et al. |
| 8,140,973 B2 | 3/2012 | Sandquist et al. |
| 8,169,463 B2 | 5/2012 | Enstad et al. |
| 8,219,624 B2 | 7/2012 | Haynes et al. |
| 8,274,893 B2 | 9/2012 | Bansal et al. |
| 8,290,998 B2 | 10/2012 | Stienhans et al. |
| 8,301,883 B2 | 10/2012 | Sundaram et al. |
| 8,340,268 B2 | 12/2012 | Knaz |
| 8,358,327 B2 | 1/2013 | Duddy |
| 8,423,615 B1 | 4/2013 | Hayes |
| 8,428,234 B2 | 4/2013 | Knaz |
| 8,433,061 B2 | 4/2013 | Cutler |
| 8,434,019 B2 | 4/2013 | Nelson |
| 8,456,507 B1 | 6/2013 | Mallappa et al. |
| 8,462,103 B1 | 6/2013 | Moscovitch et al. |
| 8,478,848 B2 | 7/2013 | Minert |
| 8,520,370 B2 | 8/2013 | Waitzman, III et al. |
| 8,625,749 B2 | 1/2014 | Jain et al. |
| 8,630,208 B1 | 1/2014 | Kjeldaas |
| 8,638,354 B2 | 1/2014 | Leow et al. |
| 8,645,464 B2 | 2/2014 | Zimmet et al. |
| 8,675,847 B2 | 3/2014 | Shaffer et al. |
| 8,694,587 B2 | 4/2014 | Chaturvedi et al. |
| 8,694,593 B1 | 4/2014 | Wren et al. |
| 8,706,539 B1 | 4/2014 | Mohler |
| 8,732,149 B2 | 5/2014 | Lida et al. |
| 8,738,080 B2 | 5/2014 | Nhiayi et al. |
| 8,751,572 B1 | 6/2014 | Behforooz et al. |
| 8,831,505 B1 | 9/2014 | Seshadri |
| 8,850,203 B2 | 9/2014 | Sundaram et al. |
| 8,860,774 B1 | 10/2014 | Sheeley et al. |
| 8,874,644 B2 | 10/2014 | Allen et al. |
| 8,890,924 B2 | 11/2014 | Wu |
| 8,892,646 B2 | 11/2014 | Chaturvedi et al. |
| 8,914,444 B2 | 12/2014 | Hladik, Jr. |
| 8,914,472 B1 | 12/2014 | Lee et al. |
| 8,924,862 B1 | 12/2014 | Luo |
| 8,930,840 B1 | 1/2015 | Riskó et al. |
| 8,947,493 B2 | 2/2015 | Lian et al. |
| 8,972,494 B2 | 3/2015 | Chen et al. |
| 9,003,445 B1 | 4/2015 | Rowe |
| 9,031,839 B2 | 5/2015 | Thorsen et al. |
| 9,032,028 B2 | 5/2015 | Davidson et al. |
| 9,075,572 B2 | 7/2015 | Ayoub et al. |
| 9,118,612 B2 | 8/2015 | Fish et al. |
| 9,131,017 B2 | 9/2015 | Kurupacheril et al. |
| 9,137,376 B1 | 9/2015 | Basart et al. |
| 9,143,729 B2 | 9/2015 | Anand et al. |
| 9,165,281 B2 | 10/2015 | Orsolini et al. |
| 9,197,701 B1 | 11/2015 | Petrov et al. |
| 9,197,848 B2 | 11/2015 | Felkai et al. |
| 9,201,527 B2 | 12/2015 | Kripalani et al. |
| 9,204,099 B2 | 12/2015 | Brown |
| 9,219,735 B2 | 12/2015 | Hoard et al. |
| 9,246,855 B2 | 1/2016 | Maehiro |
| 9,258,033 B2 | 2/2016 | Showering |
| 9,268,398 B2 | 2/2016 | Tipirneni |
| 9,298,342 B2 | 3/2016 | Zhang et al. |
| 9,323,417 B2 | 4/2016 | Sun et al. |
| 9,335,892 B2 | 5/2016 | Ubillos |
| 9,349,119 B2 | 5/2016 | Desai et al. |
| 9,367,224 B2 | 6/2016 | Ananthakrishnan et al. |
| 9,369,673 B2 | 6/2016 | Ma et al. |
| 9,407,621 B2 | 8/2016 | Vakil et al. |
| 9,432,512 B2 | 8/2016 | You |
| 9,449,303 B2 | 9/2016 | Underhill et al. |
| 9,495,664 B2 | 11/2016 | Cole et al. |
| 9,513,861 B2 | 12/2016 | Lin et al. |
| 9,516,022 B2 | 12/2016 | Borzycki et al. |
| 9,525,711 B2 | 12/2016 | Ackerman et al. |
| 9,553,799 B2 | 1/2017 | Tarricone et al. |
| 9,563,480 B2 | 2/2017 | Messerli et al. |
| 9,609,030 B2 | 3/2017 | Sun et al. |
| 9,609,514 B2 | 3/2017 | Mistry et al. |
| 9,614,756 B2 | 4/2017 | Joshi |
| 9,640,194 B1 | 5/2017 | Nemala et al. |
| 9,667,799 B2 | 5/2017 | Olivier et al. |
| 9,674,625 B2 | 6/2017 | Armstrong-Mutner Joel |
| 9,762,709 B1 | 9/2017 | Snyder et al. |
| 9,973,543 B2 * | 5/2018 | Chitroda ............ H04L 65/1069 |
| 2001/0030661 A1 | 10/2001 | Reichardt |
| 2002/0018051 A1 | 2/2002 | Singh |
| 2002/0076003 A1 | 6/2002 | Zellner et al. |
| 2002/0078153 A1 | 6/2002 | Chung et al. |

(56) References Cited

U.S. PATENT DOCUMENTS

| | | |
|---|---|---|
| 2002/0140736 A1 | 10/2002 | Chen |
| 2002/0188522 A1 | 12/2002 | McCall et al. |
| 2003/0028647 A1 | 2/2003 | Grosu |
| 2003/0046421 A1 | 3/2003 | Horvitz et al. |
| 2003/0068087 A1 | 4/2003 | Wu et al. |
| 2003/0154250 A1 | 8/2003 | Miyashita |
| 2003/0174826 A1 | 9/2003 | Hesse |
| 2003/0187800 A1 | 10/2003 | Moore et al. |
| 2003/0197739 A1 | 10/2003 | Bauer |
| 2003/0227423 A1 | 12/2003 | Arai et al. |
| 2004/0039909 A1 | 2/2004 | Cheng |
| 2004/0054885 A1 | 3/2004 | Bartram |
| 2004/0098456 A1 | 5/2004 | Krzyzanowski et al. |
| 2004/0210637 A1 | 10/2004 | Loveland |
| 2004/0253991 A1 | 12/2004 | Azuma |
| 2004/0267938 A1 | 12/2004 | Shoroff et al. |
| 2005/0014490 A1 | 1/2005 | Desai et al. |
| 2005/0031136 A1 | 2/2005 | Du et al. |
| 2005/0048916 A1 | 3/2005 | Suh |
| 2005/0055405 A1 | 3/2005 | Kaminsky et al. |
| 2005/0055412 A1 | 3/2005 | Kaminsky et al. |
| 2005/0085243 A1 | 4/2005 | Boyer et al. |
| 2005/0099492 A1 | 5/2005 | Orr |
| 2005/0108328 A1 | 5/2005 | Berkeland et al. |
| 2005/0131774 A1 | 6/2005 | Huxter |
| 2005/0175208 A1 | 8/2005 | Shaw et al. |
| 2005/0215229 A1 | 9/2005 | Cheng |
| 2005/0226511 A1 | 10/2005 | Short |
| 2005/0231588 A1 | 10/2005 | Yang et al. |
| 2005/0286711 A1 | 12/2005 | Lee et al. |
| 2006/0004911 A1 | 1/2006 | Becker et al. |
| 2006/0020697 A1 | 1/2006 | Kelso et al. |
| 2006/0026255 A1 | 2/2006 | Malamud et al. |
| 2006/0083305 A1 | 4/2006 | Dougherty et al. |
| 2006/0084471 A1 | 4/2006 | Walter |
| 2006/0164552 A1 | 7/2006 | Cutler |
| 2006/0224430 A1 | 10/2006 | Butt |
| 2006/0250987 A1 | 11/2006 | White et al. |
| 2006/0271624 A1 | 11/2006 | Lyle et al. |
| 2007/0005752 A1 | 1/2007 | Chawla et al. |
| 2007/0021973 A1 | 1/2007 | Stremler |
| 2007/0025576 A1 | 2/2007 | Wen |
| 2007/0041366 A1 | 2/2007 | Vugenfirer et al. |
| 2007/0047707 A1 | 3/2007 | Mayer et al. |
| 2007/0058842 A1 | 3/2007 | Vallone et al. |
| 2007/0067387 A1 | 3/2007 | Jain et al. |
| 2007/0091831 A1 | 4/2007 | Croy et al. |
| 2007/0100986 A1 | 5/2007 | Bagley et al. |
| 2007/0106747 A1 | 5/2007 | Singh et al. |
| 2007/0116225 A1 | 5/2007 | Zhao et al. |
| 2007/0139626 A1 | 6/2007 | Saleh et al. |
| 2007/0150453 A1 | 6/2007 | Morita |
| 2007/0168444 A1 | 7/2007 | Chen et al. |
| 2007/0198637 A1 | 8/2007 | Deboy |
| 2007/0208590 A1 | 9/2007 | Dorricott et al. |
| 2007/0248244 A1 | 10/2007 | Sato et al. |
| 2007/0250567 A1 | 10/2007 | Graham et al. |
| 2008/0059986 A1 | 3/2008 | Kalinowski et al. |
| 2008/0068447 A1 | 3/2008 | Mattila et al. |
| 2008/0071868 A1 | 3/2008 | Arenburg et al. |
| 2008/0080532 A1 | 4/2008 | O'Sullivan et al. |
| 2008/0107255 A1 | 5/2008 | Geva et al. |
| 2008/0133663 A1 | 6/2008 | Lentz |
| 2008/0154863 A1 | 6/2008 | Goldstein |
| 2008/0209452 A1 | 8/2008 | Ebert et al. |
| 2008/0270211 A1 | 10/2008 | Vander Veen et al. |
| 2008/0278894 A1 | 11/2008 | Chen et al. |
| 2009/0012963 A1 | 1/2009 | Johnson et al. |
| 2009/0019374 A1 | 1/2009 | Logan et al. |
| 2009/0049151 A1 | 2/2009 | Pagan |
| 2009/0064245 A1 | 3/2009 | Facemire et al. |
| 2009/0075633 A1 | 3/2009 | Lee et al. |
| 2009/0089822 A1 | 4/2009 | Wada |
| 2009/0094088 A1 | 4/2009 | Chen et al. |
| 2009/0100142 A1 | 4/2009 | Stern et al. |
| 2009/0119373 A1 | 5/2009 | Denner et al. |
| 2009/0132949 A1 | 5/2009 | Bosarge |
| 2009/0193327 A1 | 7/2009 | Roychoudhuri et al. |
| 2009/0234667 A1 | 9/2009 | Thayne |
| 2009/0254619 A1 | 10/2009 | Kho et al. |
| 2009/0256901 A1 | 10/2009 | Mauchly et al. |
| 2009/0278851 A1 | 11/2009 | Ach et al. |
| 2009/0282104 A1 | 11/2009 | O'Sullivan et al. |
| 2009/0292999 A1 | 11/2009 | LaBine et al. |
| 2009/0296908 A1 | 12/2009 | Lee et al. |
| 2009/0306981 A1 | 12/2009 | Cromack et al. |
| 2009/0309846 A1 | 12/2009 | Trachtenberg et al. |
| 2009/0313334 A1 | 12/2009 | Seacat et al. |
| 2010/0005142 A1 | 1/2010 | Xiao et al. |
| 2010/0005402 A1 | 1/2010 | George et al. |
| 2010/0031192 A1 | 2/2010 | Kong |
| 2010/0061538 A1 | 3/2010 | Coleman et al. |
| 2010/0070640 A1 | 3/2010 | Allen, Jr. et al. |
| 2010/0073454 A1 | 3/2010 | Lovhaugen et al. |
| 2010/0077109 A1 | 3/2010 | Yan et al. |
| 2010/0094867 A1 | 4/2010 | Badros et al. |
| 2010/0095327 A1 | 4/2010 | Fujinaka et al. |
| 2010/0121959 A1 | 5/2010 | Lin |
| 2010/0131856 A1 | 5/2010 | Kalbfleisch et al. |
| 2010/0157978 A1 | 6/2010 | Robbins et al. |
| 2010/0162170 A1 | 6/2010 | Johns et al. |
| 2010/0183179 A1 | 7/2010 | Griffin, Jr. et al. |
| 2010/0211872 A1 | 8/2010 | Rolston et al. |
| 2010/0215334 A1 | 8/2010 | Miyagi |
| 2010/0220615 A1 | 9/2010 | Enstrom et al. |
| 2010/0241691 A1 | 9/2010 | Savitzky et al. |
| 2010/0245535 A1 | 9/2010 | Mauchly |
| 2010/0250817 A1 | 9/2010 | Collopy et al. |
| 2010/0262266 A1 | 10/2010 | Chang et al. |
| 2010/0262925 A1 | 10/2010 | Liu et al. |
| 2010/0275164 A1 | 10/2010 | Morikawa |
| 2010/0302033 A1 | 12/2010 | Devenyi et al. |
| 2010/0303227 A1 | 12/2010 | Gupta |
| 2010/0316207 A1 | 12/2010 | Brunson |
| 2010/0318399 A1 | 12/2010 | Li et al. |
| 2011/0072037 A1 | 3/2011 | Lotzer |
| 2011/0075830 A1 | 3/2011 | Dreher et al. |
| 2011/0087745 A1 | 4/2011 | O'Sullivan et al. |
| 2011/0117535 A1 | 5/2011 | Benko et al. |
| 2011/0131498 A1 | 6/2011 | Chao et al. |
| 2011/0154427 A1 | 6/2011 | Wei |
| 2011/0230209 A1 | 9/2011 | Kilian |
| 2011/0264928 A1 | 10/2011 | Hinckley |
| 2011/0270609 A1 | 11/2011 | Jones et al. |
| 2011/0270921 A1* | 11/2011 | Jones ............... G06F 3/0421 |
| | | 709/204 |
| 2011/0271211 A1 | 11/2011 | Jones et al. |
| 2011/0283226 A1 | 11/2011 | Basson et al. |
| 2011/0314139 A1 | 12/2011 | Song |
| 2012/0009890 A1 | 1/2012 | Curcio et al. |
| 2012/0013704 A1 | 1/2012 | Sawayanagi et al. |
| 2012/0013768 A1 | 1/2012 | Zurek et al. |
| 2012/0026279 A1 | 2/2012 | Kato |
| 2012/0054288 A1 | 3/2012 | Wiese et al. |
| 2012/0072364 A1 | 3/2012 | Ho |
| 2012/0084714 A1 | 4/2012 | Sirpal et al. |
| 2012/0092436 A1 | 4/2012 | Pahud et al. |
| 2012/0140970 A1 | 6/2012 | Kim et al. |
| 2012/0179502 A1 | 7/2012 | Farooq et al. |
| 2012/0190386 A1 | 7/2012 | Anderson |
| 2012/0192075 A1 | 7/2012 | Ebtekar et al. |
| 2012/0233020 A1 | 9/2012 | Eberstadt et al. |
| 2012/0246229 A1 | 9/2012 | Carr et al. |
| 2012/0246596 A1 | 9/2012 | Ording et al. |
| 2012/0284635 A1 | 11/2012 | Sitrick et al. |
| 2012/0296957 A1 | 11/2012 | Stinson et al. |
| 2012/0303476 A1 | 11/2012 | Krzyzanowski et al. |
| 2012/0306757 A1 | 12/2012 | Keist et al. |
| 2012/0306993 A1 | 12/2012 | Sellers-Blais |
| 2012/0308202 A1 | 12/2012 | Murata et al. |
| 2012/0313971 A1 | 12/2012 | Murata et al. |
| 2012/0315011 A1 | 12/2012 | Messmer et al. |
| 2012/0321058 A1 | 12/2012 | Eng et al. |
| 2012/0323645 A1 | 12/2012 | Spiegel et al. |

(56) References Cited

U.S. PATENT DOCUMENTS

| | | |
|---|---|---|
| 2012/0324512 A1 | 12/2012 | Cahnbley et al. |
| 2013/0027425 A1 | 1/2013 | Yuan |
| 2013/0038675 A1 | 2/2013 | Malik |
| 2013/0047093 A1 | 2/2013 | Reuschel et al. |
| 2013/0050398 A1 | 2/2013 | Krans et al. |
| 2013/0055112 A1 | 2/2013 | Joseph et al. |
| 2013/0061054 A1 | 3/2013 | Niccolai |
| 2013/0063542 A1 | 3/2013 | Bhat et al. |
| 2013/0086633 A1 | 4/2013 | Schultz |
| 2013/0090065 A1 | 4/2013 | Fisunenko et al. |
| 2013/0091205 A1 | 4/2013 | Kotler et al. |
| 2013/0091440 A1 | 4/2013 | Kotler et al. |
| 2013/0094647 A1 | 4/2013 | Mauro et al. |
| 2013/0113602 A1 | 5/2013 | Gilbertson et al. |
| 2013/0113827 A1 | 5/2013 | Forutanpour et al. |
| 2013/0120522 A1 | 5/2013 | Lian et al. |
| 2013/0124551 A1 | 5/2013 | Foo |
| 2013/0129252 A1 | 5/2013 | Lauper et al. |
| 2013/0135837 A1 | 5/2013 | Kemppinen |
| 2013/0141371 A1 | 6/2013 | Hallford et al. |
| 2013/0148789 A1 | 6/2013 | Hillier et al. |
| 2013/0182063 A1 | 7/2013 | Jaiswal et al. |
| 2013/0185672 A1 | 7/2013 | McCormick et al. |
| 2013/0198629 A1 | 8/2013 | Tandon et al. |
| 2013/0198635 A1* | 8/2013 | Jones .................. H04L 65/104 715/727 |
| 2013/0210496 A1 | 8/2013 | Zakarias et al. |
| 2013/0211826 A1 | 8/2013 | Mannby |
| 2013/0212202 A1 | 8/2013 | Lee |
| 2013/0215215 A1 | 8/2013 | Gage et al. |
| 2013/0219278 A1 | 8/2013 | Rosenberg |
| 2013/0222246 A1 | 8/2013 | Booms et al. |
| 2013/0225080 A1 | 8/2013 | Doss |
| 2013/0227433 A1 | 8/2013 | Doray et al. |
| 2013/0235866 A1 | 9/2013 | Tian et al. |
| 2013/0242030 A1 | 9/2013 | Kato et al. |
| 2013/0243213 A1 | 9/2013 | Moquin |
| 2013/0252669 A1 | 9/2013 | Nhiayi |
| 2013/0263020 A1 | 10/2013 | Heiferman et al. |
| 2013/0290421 A1 | 10/2013 | Benson et al. |
| 2013/0297704 A1 | 11/2013 | Alberth |
| 2013/0300637 A1 | 11/2013 | Smits et al. |
| 2013/0325970 A1 | 12/2013 | Roberts et al. |
| 2013/0329865 A1 | 12/2013 | Ristock et al. |
| 2013/0335507 A1 | 12/2013 | Aarrestad et al. |
| 2014/0012990 A1 | 1/2014 | Ko |
| 2014/0028781 A1 | 1/2014 | MacDonald |
| 2014/0040404 A1 | 2/2014 | Pujare et al. |
| 2014/0040819 A1 | 2/2014 | Duffy |
| 2014/0063174 A1 | 3/2014 | Junuzovic et al. |
| 2014/0068452 A1 | 3/2014 | Joseph et al. |
| 2014/0068670 A1 | 3/2014 | Timmermann et al. |
| 2014/0078182 A1 | 3/2014 | Utsunomiya |
| 2014/0108486 A1 | 4/2014 | Borzycki |
| 2014/0111597 A1 | 4/2014 | Anderson et al. |
| 2014/0136630 A1 | 5/2014 | Siegel et al. |
| 2014/0157338 A1 | 6/2014 | Pearce |
| 2014/0161243 A1 | 6/2014 | Contreras et al. |
| 2014/0195557 A1 | 7/2014 | Oztaskent et al. |
| 2014/0198175 A1 | 7/2014 | Shaffer et al. |
| 2014/0237371 A1 | 8/2014 | Klemm et al. |
| 2014/0253671 A1 | 9/2014 | Bentley et al. |
| 2014/0280595 A1 | 9/2014 | Mani et al. |
| 2014/0282213 A1 | 9/2014 | Musa et al. |
| 2014/0296112 A1 | 10/2014 | O'Driscoll et al. |
| 2014/0298210 A1 | 10/2014 | Park et al. |
| 2014/0317561 A1 | 10/2014 | Robinson et al. |
| 2014/0337840 A1 | 11/2014 | Hyde et al. |
| 2014/0351327 A1 | 11/2014 | Huang |
| 2014/0358264 A1 | 12/2014 | Long et al. |
| 2014/0372908 A1 | 12/2014 | Kashi et al. |
| 2015/0004571 A1 | 1/2015 | Ironside et al. |
| 2015/0009278 A1 | 1/2015 | Modai et al. |
| 2015/0029301 A1 | 1/2015 | Nakatomi et al. |
| 2015/0067552 A1 | 3/2015 | Leorin et al. |
| 2015/0070835 A1 | 3/2015 | Mclean |
| 2015/0074189 A1 | 3/2015 | Cox et al. |
| 2015/0081885 A1 | 3/2015 | Thomas et al. |
| 2015/0082350 A1 | 3/2015 | Ogasawara et al. |
| 2015/0085060 A1 | 3/2015 | Fish et al. |
| 2015/0088575 A1 | 3/2015 | Asli et al. |
| 2015/0089393 A1 | 3/2015 | Zhang et al. |
| 2015/0089394 A1 | 3/2015 | Chen et al. |
| 2015/0113050 A1 | 4/2015 | Stahl |
| 2015/0113369 A1 | 4/2015 | Chan et al. |
| 2015/0128068 A1 | 5/2015 | Kim |
| 2015/0172120 A1 | 6/2015 | Dwarampudi et al. |
| 2015/0178626 A1 | 6/2015 | Pielot et al. |
| 2015/0215365 A1 | 7/2015 | Shaffer et al. |
| 2015/0254760 A1 | 9/2015 | Pepper |
| 2015/0288774 A1 | 10/2015 | Larabie-Belanger |
| 2015/0301691 A1 | 10/2015 | Qin |
| 2015/0304120 A1 | 10/2015 | Xiao et al. |
| 2015/0304366 A1 | 10/2015 | Bader-Natal et al. |
| 2015/0319113 A1 | 11/2015 | Gunderson et al. |
| 2015/0350126 A1 | 12/2015 | Xue |
| 2015/0373063 A1 | 12/2015 | Vashishtha et al. |
| 2015/0373414 A1 | 12/2015 | Kinoshita |
| 2016/0037304 A1 | 2/2016 | Dunkin et al. |
| 2016/0043986 A1 | 2/2016 | Ronkainen |
| 2016/0044159 A1 | 2/2016 | Wolff et al. |
| 2016/0044380 A1 | 2/2016 | Barrett |
| 2016/0050079 A1 | 2/2016 | Martin De Nicolas et al. |
| 2016/0050175 A1 | 2/2016 | Chaudhry et al. |
| 2016/0070758 A1 | 3/2016 | Thomson et al. |
| 2016/0071056 A1 | 3/2016 | Ellison et al. |
| 2016/0072862 A1 | 3/2016 | Bader-Natal et al. |
| 2016/0094593 A1 | 3/2016 | Priya |
| 2016/0105345 A1 | 4/2016 | Kim et al. |
| 2016/0105472 A1* | 4/2016 | Chitroda ............. H04L 65/1069 709/204 |
| 2016/0110056 A1 | 4/2016 | Hong et al. |
| 2016/0165056 A1 | 6/2016 | Bargetzi et al. |
| 2016/0173537 A1 | 6/2016 | Kumar et al. |
| 2016/0182580 A1 | 6/2016 | Nayak |
| 2016/0266609 A1 | 9/2016 | McCracken |
| 2016/0269411 A1 | 9/2016 | Malachi |
| 2016/0277461 A1 | 9/2016 | Sun et al. |
| 2016/0283909 A1 | 9/2016 | Adiga |
| 2016/0307165 A1 | 10/2016 | Grodum et al. |
| 2016/0309037 A1 | 10/2016 | Rosenberg et al. |
| 2016/0321347 A1 | 11/2016 | Zhou et al. |
| 2017/0006162 A1 | 1/2017 | Bargetzi et al. |
| 2017/0006446 A1 | 1/2017 | Harris et al. |
| 2017/0070706 A1 | 3/2017 | Ursin et al. |
| 2017/0093874 A1 | 3/2017 | Uthe |
| 2017/0104961 A1 | 4/2017 | Pan et al. |
| 2017/0171260 A1 | 6/2017 | Jerrard-Dunne et al. |
| 2017/0324850 A1 | 11/2017 | Snyder et al. |

FOREIGN PATENT DOCUMENTS

| | | |
|---|---|---|
| CN | 102572370 | 7/2012 |
| CN | 102655583 | 9/2012 |
| CN | 101729528 | 11/2012 |
| CN | 102938834 | 2/2013 |
| CN | 103141086 | 6/2013 |
| CN | 204331453 | 5/2015 |
| DE | 3843033 | 9/1991 |
| EP | 959585 | 11/1999 |
| EP | 2773131 | 9/2014 |
| EP | 2341686 | 8/2016 |
| WO | WO 98/55903 | 12/1998 |
| WO | WO 2008/139269 | 11/2008 |
| WO | WO 2012/167262 | 12/2012 |
| WO | WO 2014/118736 | 8/2014 |
| WO | WO 2015/047216 | 4/2015 |

OTHER PUBLICATIONS

"Cisco webex: WebEx Meeting Center User Guide for Hosts, Presenters, and Participants" © 1997-2013 Cisco Inc. (pp. 1-394

(56) References Cited

OTHER PUBLICATIONS plus table of contents) https://www.cisco.com/c/dam/en/us/td/docs/collaboration/meeting_center/wx_mc_host_ug.pdf.
Author Unknown, "A Primer on the H.323 Series Standard," Version 2.0, available at http://www.packetizer.com/voip/h323/papers/primer/, retrieved on Dec. 20, 2006, 17 pages.
Author Unknown, ""I can see the future" 10 predictions concerning cell-phones," Surveillance Camera Players, http://www.notbored.org/cell-phones.html, Jun. 21, 2003, 2 pages.
Author Unknown, "Active screen follows mouse and dual monitors," KDE Community Forums, Apr. 13, 2010, 3 pages.
Author Unknown, "Implementing Media Gateway Control Protocols" A RADVision White Paper, Jan. 27, 2002, 16 pages.
Author Unknown, "Manage Meeting Rooms in Real Time," Jan. 23, 2017, door-tablet.com, 7 pages.
Averusa, "Interactive Video Conferencing K-12 applications," "Interactive Video Conferencing K-12 applications" copyright 2012. http://www.averusa.com/education/downloads/hvc brochure goved.pdf (last accessed Oct. 11, 2013).
Choi, Jae Young, et al; "Towards an Automatic Face Indexing System for Actor-based Video Services in an IPTV Environment," IEEE Transactions on 56, No. 1 (2010): 147-155.
Cisco Systems, Inc., "Cisco WebEx Meetings Server System Requirements release 1.5." 30 pages, Aug. 14, 2013.
Cisco Systems, Inc., "Cisco Unified Personal Communicator 8.5", 2011, 9 pages.
Cisco White Paper, "Web Conferencing: Unleash the Power of Secure, Real-Time Collaboration," pp. 1-8, 2014.
Clarke, Brant, "Polycom Announces RealPresence Group Series" "Polycom Announces RealPresence Group Series" dated Oct. 8, 2012 available at http://www.323.tv/news/polycom-realpresence-group-series (last accessed Oct. 11, 2013).
Clauser, Grant, et al., "Is the Google Home the voice-controlled speaker for you?," The Wire Cutter, Nov. 22, 2016, pp. 1-15.
Cole, Camille, et al., "Videoconferencing for K-12 Classrooms," Second Edition (excerpt), http://www.iste.org/docs/excerpts/VIDCO2-excerpt.pdf (last accessed Oct. 11, 2013), 2009.
Eichen, Elliot, et al., "Smartphone Docking Stations and Strongly Converged VoIP Clients for Fixed-Mobile convergence," IEEE Wireless Communications and Networking Conference: Services, Applications and Business, 2012, pp. 3140-3144.
Epson, "BrightLink Pro Projector," BrightLink Pro Projector. http://www.epson.com/cgi-bin/Store/jsp/Landing/brightlink-pro-interactive-projectors.do?ref=van brightlink-pro—dated 2013 (last accessed Oct. 11, 2013).
Grothaus, Michael, "How Interactive Product Placements Could Save Television," Jul. 25, 2013, 4 pages.
Hannigan, Nancy Kruse, et al., The IBM Lotus Samteime VB Family Extending the IBM Unified Communications and Collaboration Strategy (2007), available at http://www.ibm.com/developerworks/lotus/library/sametime8-new/, 10 pages.
Hirschmann, Kenny, "TWIDDLA: Smarter Than the Average Whiteboard," Apr. 17, 2014, 2 pages.

Infocus, "Mondopad," Mondopad. http://www.infocus.com/sites/default/files/InFocus-Mondopad-INF5520a-INF7021-Datasheet-EN.pdf (last accessed Oct. 11, 2013), 2013.
MacCormick, John, "Video Chat with Multiple Cameras," CSCW '13, Proceedings of the 2013 conference on Computer supported cooperative work companion, pp. 195-198, ACM, New York, NY, USA, 2013.
Microsoft, "Positioning Objects on Multiple Display Monitors," Aug. 12, 2012, 2 pages.
Mullins, Robert, "Polycom Adds Tablet Videoconferencing," Mullins, R. "Polycom Adds Tablet Videoconferencing" available at http://www.informationweek.com/telecom/unified-communications/polycom-adds-tablet-videoconferencing/231900680 dated Oct. 12, 2011 (last accessed Oct. 11, 2013).
Nu-Star Technologies, "Interactive Whiteboard Conferencing," Interactive Whiteboard Conferencing. http://www.nu-star.com/interactive-conf.php dated 2013 (last accessed Oct. 11, 2013).
Nyamgondalu, Nagendra, "Lotus Notes Calendar and Scheduling Explained!" IBM, Oct. 18, 2004, 10 pages.
Polycom, "Polycom RealPresence Mobile: Mobile Telepresence & Video Conferencing," http://www.polycom.com/products-services/hd-telepresence-video-conferencing/realpresence-mobile.html#stab1 (last accessed Oct. 11, 2013), 2013.
Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Video Collaboration—http://www.polycom.com/company/news/press-releases/2011/20111027 2.html—dated Oct. 27, 2011.
Polycom, "Polycom UC Board, Transforming ordinary surfaces into virtual whiteboards" 2012, Polycom, Inc., San Jose, CA, http://www.uatg.com/pdf/polycom/polycom-ue-board- datasheet.pdf, (last accessed Oct. 11, 2013).
Schreiber, Danny, "The Missing Guide for Google Hangout Video Calls," Jun. 5, 2014, 6 pages.
Shervington, Martin, "Complete Guide to Google Hangouts for Businesses and Individuals," Mar. 20, 2014, 15 pages.
Shi, Saiqi, et al, "Notification That a Mobile Meeting Attendee is Driving", May 20, 2013, 13 pages.
Stevenson, Nancy, "Webex Web Meetings for Dummies," Wiley Publishing, Inc. 2005, 320 pages.
Stodle. Daniel, et al., "Gesture-Based, Touch-Free Multi-User Gaming on Wall-Sized, High-Resolution Tiled Displays," 2008, 13 pages.
Thompson, Phil, et al., "Agent Based Ontology Driven Virtual Meeting Assistant," Future Generation Information Technology, Springer Berlin Heidelberg, 2010, 4 pages.
Tno, "Multi-Touch Interaction Overview," Dec. 1, 2009, 12 pages.
Toga, James, et al., "Demystifying Multimedia Conferencing Over the Internet Using the H.323 Set of Standards," Intel Technology Journal Q2, 1998, 11 pages.
Ubuntu, "Force Unity to open new window on the screen where the cursor is?" Sep. 16, 2013, 1 page.
VB Forums, "Pointapi," Aug. 8, 2001, 3 pages.
Vidyo, "VidyoPanorama," VidyoPanorama—http://www.vidyo.com/products/vidyopanorama/ dated 2013 (last accessed Oct. 11, 2013).

* cited by examiner

SHARING RESOURCES ACROSS MULTIPLE DEVICES IN ONLINE MEETINGS

CROSS-REFERENCE TO RELATED APPLICATIONS

This application is a Continuation of U.S. application Ser. No. 14/460,143, filed on Aug. 14, 2014, the contents of which are herein incorporated by reference in its entirety.

TECHNICAL FIELD

The present disclosure relates generally to improved solutions for sharing resources such as an application, a user environment, or a file in online meetings, and in particular for controlling, from a primary device in an online meeting, one or more secondary devices to share resources of those secondary devices with other participants of the online meeting.

BACKGROUND

Online meetings serviced by online meeting platforms, such as WebEx® of Cisco Systems, Inc. of San Jose, Calif., have revolutionized the way people share information with each other by allowing users located in geographically dispersed locations to remotely connect to each other and simultaneously communicate through text, audio, and/or video. Sometimes it may be beneficial for a user to connect to a meeting from more than one device. For example, a user may wish to communicate with other meeting participants from her mobile device because of the convenience and mobility that the mobile device offers, but may also want to share information from her desktop computer because her desktop computer offers superior computing power and storage capability. In addition, some resources might only be available on the user's other devices.

However, traditional online meeting solutions do not offer a good way to join an online meeting from more than one device. Moreover, when an additional device belonging to an existing user joins a meeting, the newly added device typically shows up in the participant roster as belonging to a separate and independent user account. This can be often confusing to other meeting participants because it may be difficult for them to identify which one of the multiple devices needs to be engaged when addressing the user behind those multiple devices.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DESCRIPTION OF EXAMPLE EMBODIMENTS

Figure 1:
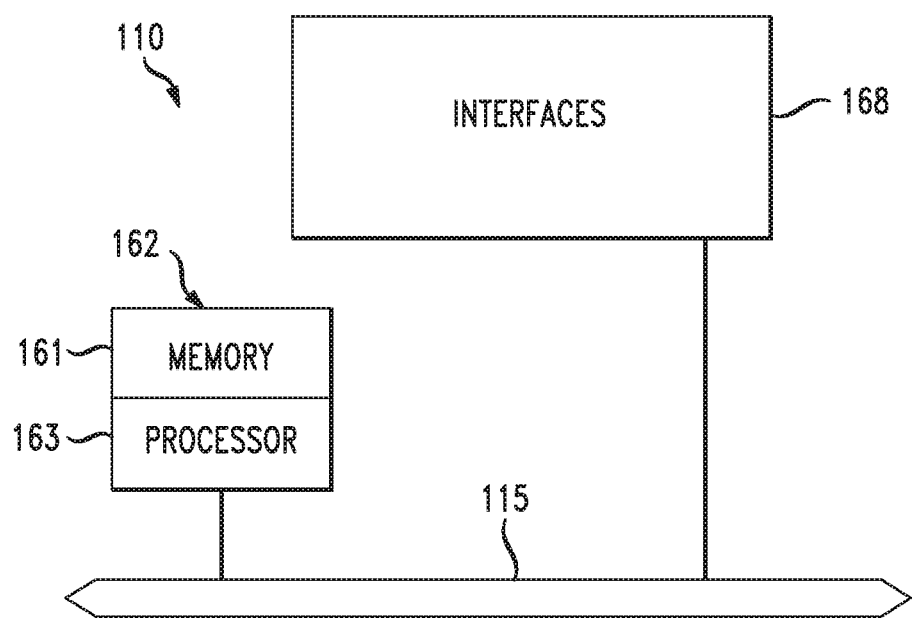
FIG. 1 illustrates an example network device.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

A system, method, and computer-readable storage devices are disclosed which address the issues raised above regarding sharing contents of a different device in an online meeting. The various embodiments disclosed herein can allow a user to connect to an online meeting server with more than one device at a time and designate one of those devices as the primary device that can establish a control session over any of the user's secondary devices. Once the control session is established, the primary device can take full or partial control of the secondary device(s), obtain a list of resources, such as applications, desktop environments, contents, etc., available on the secondary device(s), and/or share one or more of those resources of the secondary device(s) with other participants in the meeting. In addition, the user may move from one device to another device at any time to designate the new active device as the primary device.

Moreover, multiple devices belonging to one user can be hidden from the other users' view. In other words, from the perspectives of the other users, more than one device that a user may be using to connect to the meeting may simply appear as one device under one user account rather than multiple devices under separate user accounts. Alternatively, the multiple devices can appear as though they are collapsed or consolidated into a single device.

In certain aspects, a client device may log into an online meeting service and the server identifies and verifies the user using a security token. When the user joins the meeting, the client device may receive a public-private key pair from the server. The server can identify any other client devices with the same public key that join the meeting as belonging to the same user. The user can use one of the devices to establish a control session with the other devices using the key pair. Once the control session is established, the device that the user is actively using can be designated as the primary device. The primary device may share applications, desktop environments, and other resources that are available on the controlled device(s).

In some embodiments, a server can receive from a first client device a command for a second client device to share a resource with a third client device. The first client device, the second client device, and the third device may be participating in an online meeting that is managed by the server. In particular, the first client device and the second device may respectively be the primary device and the secondary device associated with a first user, and the third client device may be associated with a second user.

Description

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

An online meeting is a service that allows two or more users in disparate or remote locations communicate with each other substantially in real time by simultaneously or sequentially exchanging streams of data including text, audio, video, images, animations, documents, etc. among the participating client devices. For instance, participants in the online meeting can host a live event such as an audio chat session, a video chat session, a slideshow presentation, a virtual whiteboard presentation, etc. and/or share a local resource such as a document, a picture, a recording, a video, etc.

Online meetings are typically made possible by the Internet and other network technologies and standards such as the TCP/IP. Online meetings can be conducted on a point-to-point basis or via multicast. Online meetings can be initiated/managed/mediated by a server, to whom various client devices may connect in order to participate in a meeting. The client devices, and hence their respective users, may be situated across geographically dispersed locations. For instance, online meetings enable users that are located in different cities, different states, or even different countries to conduct a virtual meeting over the Internet in real time. The client devices can be equipped with various hardware and software components to facilitate participation in the online meetings. For example, a client device may have hardware components such as one or more processors, a memory, one or more network interfaces, one or more input devices (e.g., a mouse, a keyboard, a keypad, a touchscreen, a microphone, a loudspeaker, a camera), one or more output devices (e.g., a display, a speaker), a storage, etc. The client device may have various software components that enable it to connect to the server. The client device may use stand-alone conferencing software that runs on an operating system to accomplish this. Alternatively, the client device may allow its user to use a web-based solution that runs inside a web browser to participate in meetings.

Even though the term "online meeting" is used throughout this disclosure, the utility of the online meetings is not strictly limited to conducting meetings. Rather, online meetings can be used for many other purposes such as conducting presentations, training sessions, lectures, discussions, broadcast events, etc. In addition, other terms such as a web meeting, an online conference, a web conference, a video conference, an interactive conference, a webinar, an online workshop, a remote meeting, a remote conference, a virtual meeting, a virtual conference, etc. or any combination thereof may be used interchangeably.

A "resource," as used throughout this disclosure, may mean any information or data that may be stored or represented in a client device. A resource can be a collection of data bits. A resource can be a file. In some embodiments, a resource can be a text, an audio, a video, a document, a code, a script, or instructions. In other embodiments, a resource can be an application, a dialogue box, a prompt, or a user interface element. In yet other embodiments, a resource can be a desktop environment, a system environment, or a user interface (UI). A resource on one device may be shared on a different device. For example, a finance app running on a desktop computer can be shared on a separate mobile device, from which the app may be viewed, manipulated, and/or interacted with.

A "desktop environment" is a visual metaphor employed in computer operating systems (OS) for their users to interact with the underlying data structure. For example, on a Windows® OS, files and folders are represented by icons that are arranged inside a "desktop" space in a graphical user interface (GUI). Various applications and UI elements such as buttons, menus, boxes, bars, panes, icons, input indicator (e.g., mouse pointer, touch indicator, button press indicator, etc.), text can be overlaid on top of the desktop to represent other resources and information. The term "desktop" or "desktop environment" may include any or all of these UI elements that are visible via the GUI to a user. Thus, when a desktop environment of a desktop computer is shared on a mobile device, for example, the user of the mobile device may be able to view some or all of what is displayed on the desktop computer's user interface such as UI elements, applications, etc. Furthermore, the user may use the mobile device to interact with the various UI elements and/or apps on the desktop computer. Thus, by sharing one client device's entire desktop environment, what is displayed on a screen of that client device along with its user interface can be substantially duplicated or mirrored onto another client device.

A system environment of a client device that does not employ a desktop metaphor can be also shared with other client devices. For example, a smartphone or a tablet device may not rely on traditional desktop environments that are widely used in desktop or laptop computers. However, one of skill in the art will understand that the system environments of such devices including their user interfaces and/or user experiences (UX) may also be shared, duplicated, or mirrored onto other client devices.

A "key," as used throughout this disclosure, may mean a piece of information such as a hexadecimal number used in public-key cryptography or asymmetric cryptography. In public-key cryptography, two separate keys—a public key and a private key—may be generated by one or more mathematical formulas such that the public key may be used for encrypting data and verifying a digital signature while the private key may be used for decrypting data and creating a digital signature.

Figure 2:
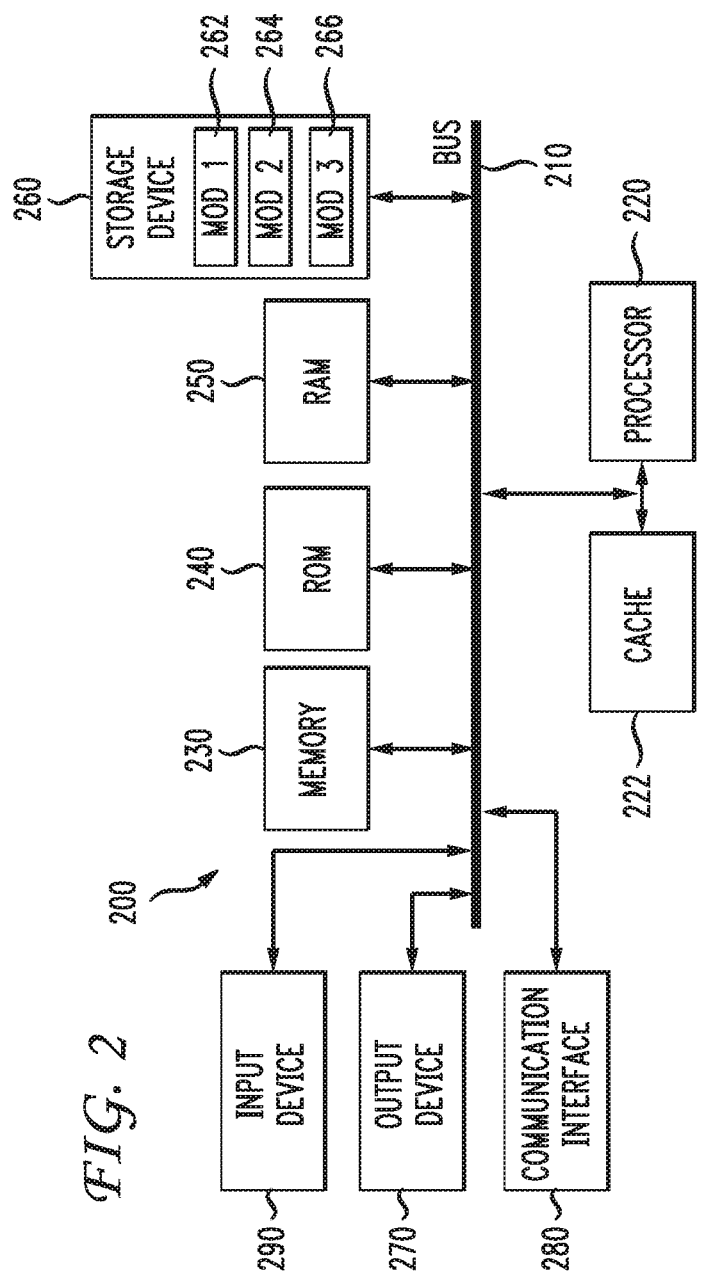
FIG. 2 illustrates an example system embodiment.

The disclosed technology addresses the need in the art for providing effective means for sharing resources using multiple client devices. Disclosed are methods, systems, and computer-readable storage media for sharing resources in online meetings. A brief introductory description of exemplary systems, as illustrated in FIGS. 1 and 2, is disclosed herein. A detailed description of an online meeting server, various client devices, components, and exemplary variations, will then follow. These variations shall be described herein as the various embodiments are set forth. The disclosure now turns to FIG. 1.

FIG. 1 illustrates an exemplary network device 110 suitable for implementing the present invention. Network device 110 includes master central processing unit (CPU) 162, interfaces 168, and bus 115 (e.g., a PCI bus). When acting under the control of appropriate software or firmware, CPU 162 is responsible for executing packet management, error detection, and/or routing functions, such as miscabling detection functions, for example. CPU 162 preferably accomplishes all these functions under the control of software including an operating system and any appropriate applications software. CPU 162 may include one or more processors 163 such as a processor from the Motorola family of microprocessors or the MIPS family of microprocessors. In some alternative embodiments, processor 163 is specially designed hardware for controlling the operations of router 110. In some embodiments, a memory 161 (such as non-volatile RAM and/or ROM) also forms part of CPU 162. However, there are many different ways in which memory could be coupled to the system.

Interfaces 168 are typically provided as interface cards (sometimes referred to as "line cards"). Generally, they control the sending and receiving of data packets over the network and sometimes support other peripherals used with router 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 2 illustrates an example of an electronic system with which some aspects of the subject technology can be implemented. As illustrated, system 200 includes a general-purpose computing device 200, including central processing unit (CPU or processor) 220 and system bus 210 that couples various system components including system memory 230 such as read only memory (ROM) 240 and random access memory (RAM) 250 to processor 220. System 200 can include a cache 222 of high speed memory connected directly with, in close proximity to, or integrated as part of processor 220. System 200 copies data from memory 230 and/or storage device 260 to cache 222 for quick access by processor 220. In this way, cache 222 provides a performance boost that avoids processor 220 delays while waiting for data. These and other modules can control or be configured to control processor 220 to perform various actions. Other system memory 230 may be available for use as well. Memory 230 can include multiple different types of memory with different performance characteristics. It can be appreciated that the disclosure may operate on computing device 200 which includes more than one processor 220 or on a group or cluster of computing devices networked together to provide greater processing capability.

Processor 220 can include any general purpose processor and a hardware module or software module, such as module 1 (262), module 2 (264), and module 3 (266) stored in storage device 260, configured to control processor 220 as well as a special-purpose processor where software instructions are incorporated into the actual processor design. Processor 220 may essentially be a completely self-contained computing system, containing multiple cores or processors, a bus, memory controller, cache, etc. A multi-core processor may be symmetric or asymmetric.

System bus 210 may be any of several types of bus structures including a memory bus or memory controller, a peripheral bus, and a local bus using any of a variety of bus architectures. A basic input/output (BIOS) stored in ROM 240 or the like, can provide basic routines that help to transfer information between elements within computing device 200, such as during start-up. Computing device 200 can further include storage devices 260 such as a hard disk drive, a magnetic disk drive, an optical disk drive, tape drive or the like. Storage device 260 can include one or more software modules 262, 264, 266 for controlling the processor 220. Storage device 260 is connected to system bus 210 by a drive interface. The drives and the associated computer readable storage media provide nonvolatile storage of computer readable instructions, data structures, program modules and other data for computing device 200.

In some aspects, a hardware module that performs a particular function includes the software component stored in a non-transitory computer-readable medium in connection with the necessary hardware components, such as processor 220, bus 210 and so forth, to carry out the function. The basic components are known to those of skill in the art and appropriate variations are contemplated depending on the type of device, such as whether the device 200 is a handheld computing device, such as a smart phone, or larger computing device, such as a desktop computer, or a computer server.

By way of example, processor 220 can be configured to execute operations to receive a command for a client device to share a resource with another client device, forward the command, receive data associated with the resource, forward the data, etc.

Although the exemplary embodiment described herein employs storage device 260, it should be appreciated by those skilled in the art that other types of computer-readable media or devices which can store data that are accessible by a computer, such as magnetic cassettes, magnetic hard disks, flash memory cards, solid-state drives, digital versatile disks, cartridges, random access memories (RAMs) 250, read only memory (ROM) 240, a cable or wireless signal containing a bit stream and the like, may also be used in the exemplary operating environment. Non-transitory computer-readable storage media expressly exclude media such as energy, carrier signals, electromagnetic waves, and transitory signals per se. Storage device 260 may store instructions which, when executed by processor 220, can cause processor 220 to perform and implement various embodiments set forth herein.

To enable user interaction with the computing device 200, an input device 290 represents any number of input mechanisms, such as a microphone for speech, a touch-sensitive screen for gesture or graphical input, keyboard, mouse, motion input, a camera, speech and so forth. An output device 270 can also be one or more of a number of output mechanisms known to those of skill in the art. In some instances, multimodal systems enable a user to provide multiple types of input to communicate with the computing device 200. The communications interface 280 generally governs and manages the user input and system output. There is no restriction on operating on any particular hardware arrangement and therefore the basic features here may easily be substituted for improved hardware or firmware arrangements as they are developed.

System 200 can be a server that prepares, initiates, mediates, and/or conduct online meetings. Alternatively, system 200 can be a client device, such as a desktop computer, a laptop computer, a tablet device, a telephone, a smartphone, a Voice-over-Internet Protocol (VoIP) phone, a mobile device, etc. that a user may use to participate in an online meeting.

For clarity of explanation, the illustrative system embodiment is presented as including individual functional blocks including functional blocks labeled as a "processor" or processor 220. The functions these blocks represent may be provided through the use of either shared or dedicated hardware, including, but not limited to, hardware capable of executing software and hardware, such as a processor 220, that is purpose-built to operate as an equivalent to software executing on a general purpose processor. For example, the functions of one or more processors may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 240 for storing software performing the operations discussed below, and random access memory (RAM) 250 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 200 can practice all or part of the recited methods, can be a part of the recited systems, and/or can operate according to instructions in the recited non-transitory computer-readable storage media. Such logical operations can be implemented as modules configured to control the processor 220 to perform particular functions according to the programming of the module.

For example, FIG. 2 illustrates three modules Mod1 (262), Mod2 (264), and Mod3 (266) that are modules configured to control the processor 220. These modules may be stored on the storage device 260 and loaded into RAM 250 or memory 230 at runtime or may be stored as would be known in the art in other computer-readable memory locations.

Figure 3:
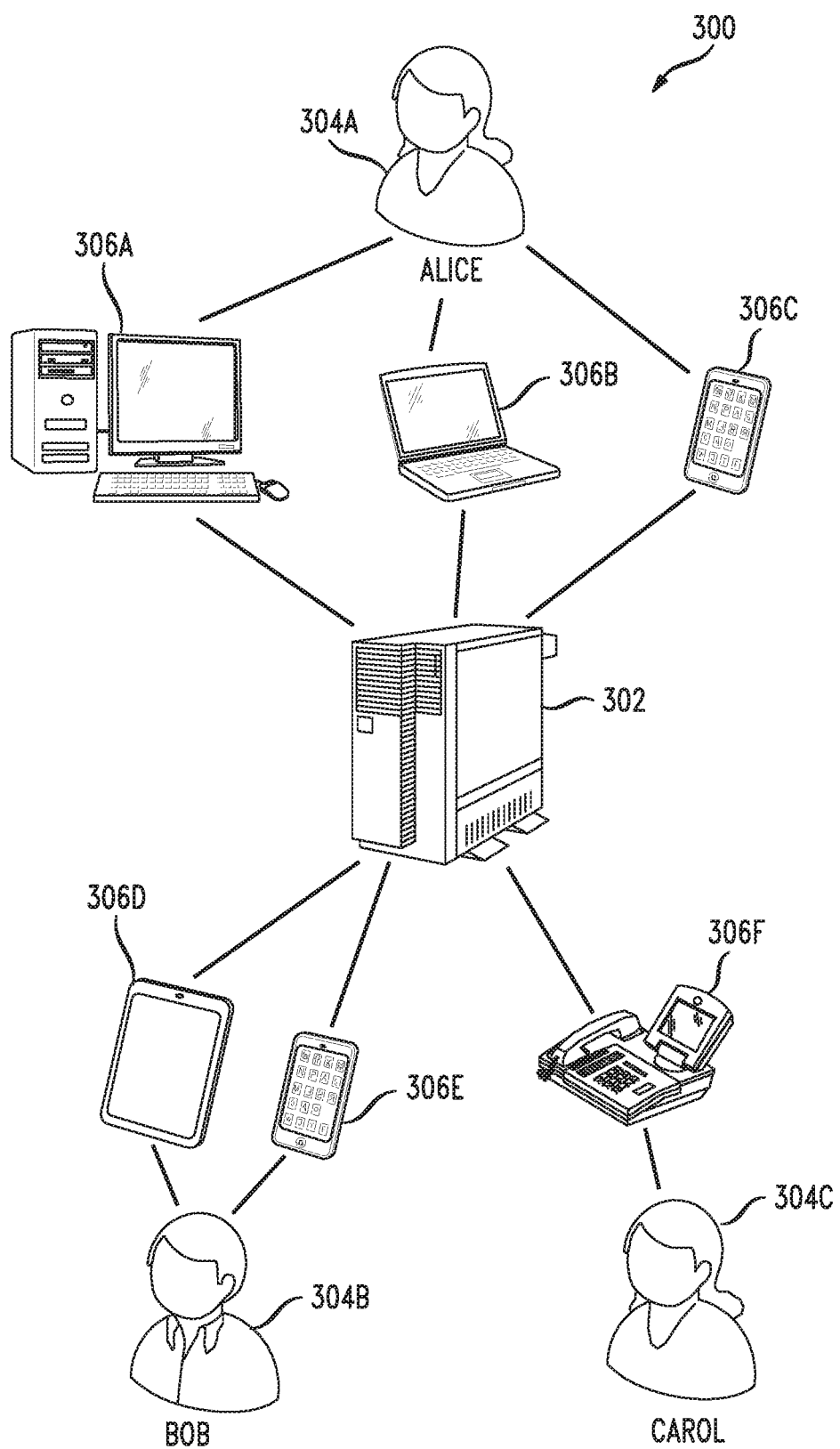
FIG. 3 illustrates exemplary devices participating in an online meeting.

FIG. 3 illustrates exemplary devices participating in an online meeting. Exemplary online meeting session 300 is being managed by server 302, to whom various client devices 306A-F (collectively "306") may connect in order to participate in online meeting session 300. Server 302 may allow various clients 306 with diverse form factors, manufacturers, platforms, operating systems, communication protocols, versions, computing powers, etc. to join in online meeting session 300. Server 302 may consist of multiple servers, some of which can be distributed in physically remote locations from each other. Client devices 306 can communicate with one or more servers 302 or with each other via point-to-point or broadcast communication. Client devices 306 can be any device that is capable of communicating with a remote device and conducting an online meeting session. Client devices 306 can be, for example, a network device, a computer (e.g., a desktop computer, a laptop computer, a handheld computer, a wearable computer), a tablet device, a telephone, a Session Initiation Protocol(SIP)-enabled VoIP telephone, a video phone, a conference hub, a smartphone, or a mobile device. Each of client devices 306 can connect to server 302 via various types of networks (not shown) such as LANs, WANs, virtual private networks (VPNs), the Internet, etc. Client devices 306 may be also connected to each other directly (not shown) via various types of networks, without having to go through server 302. For example, client device 306C can issue commands directly to client devices 306A and 306B without the help of server 302. Similarly, in some embodiments, a data stream from client device 306A can circumvent server 302 and be transmitted directly to client device 306E.

Exemplary users Alice 304A, Bob 304B, and Carol 304C (collectively "304") are three participants in online meeting session 300. Although exemplary online meeting session 300 is depicted as having three users 304, an online meeting may have any number of users or no users at all. Each user 304 may participate in online meeting 300 using one or more client devices 306. For example, Alice 304A may use desktop computer 306A equipped with Windows® operating system, laptop computer 306B equipped with Mac OS®, and an Android® KitKat®-equipped smartphone 306C. Meanwhile, user Bob 304 may choose to participate in online meeting session 300 on his iPad® tablet device 306D with iOS® version 7.1.2 and his iPhone® smartphone 306E with iOS® version 6.2. Meanwhile, user Carol 304C may join in online meeting 300 on her office desk telephone 306F with video conferencing capability. Client devices 306 can be equipped with various sensors, peripheral devices, and/or features that facilitate online conferencing such as a still camera, a video camera, a microphone, a display screen, a loudspeaker, a GUI, a voice recognizer, a text-to-speech converter, an input device (e.g., a mouse, a keyboard, a keypad, a touch sensor, a motion sensor), etc.

Each user 304 may be assigned a single user account and its associated username and password. The user account can be assigned and maintained by server 302. Alternatively, each client device may be assigned a separate username. In other words, Alice 304A, Bob 304B, and Carol 304C may be provided with three usernames, two usernames, and one username, respectively, with one username per client device. Server 302 may store other relevant user information with a corresponding user account. Notably, server 302 may keep track of client devices 306D, 306E that Bob 304B is known to use to connect to online meeting 300. For example, server 302 can store the device identifiers (e.g., serial numbers, model numbers, network addresses, etc.) of all the client devices that may attempt to connect to server 302 and associate them with corresponding users 304. Additionally, server 302 may authenticate client devices 306 and/or their users 304 when establishing a connection to them and before allowing them to participate in online meeting 300.

Users 304 can use one or more of their devices concurrently to participate in online session 300. As an illustration, user Alice 304A can join online session 300 by logging into server 302 on her office desktop PC 306A. She then moves away from her desktop to rejoin online session 300 on her laptop PC 306B while her desktop PC 306A is still connected to server 302. Subsequently, she comes home with her laptop computer 306B and continues to participate in online meeting 300. She may also use her smartphone 306C to connect to server 302 to join online meeting 300. Each time she moves from one client device to another client device, the device that she is currently and actively using may be considered an "active" client device, and server 302 can designate such device as the active or primary client device for user Alice 304A. Other client devices belonging to user Alice 304A but currently not being actively used by Alice 304A then may be designated secondary client devices. In the above example, Alice's 304A first primary device was her desktop computer 306A. When she connects to server 302 on her laptop computer 306B, her desktop computer 306A becomes secondary and laptop computer 306B becomes her new primary client device. Finally, once Alice 304A uses her smartphone 306C to join online meeting 300, smartphone 306C becomes the new primary client device and desktop PC 306A and laptop PC 306B both become secondary client devices.

Users 304 may use his or her primary client device to establish a control session over one or more secondary devices and share various resources that are available on the secondary device(s) with client devices of other users. In the example given above, after arriving at home, Alice 304A may want to share an application that is currently running on her office desktop computer 306A with her colleagues Bob 304B and Carol 304C. Since she is at a remote location (i.e., home) she cannot access her office computer 306A physically. However, using her laptop computer 306B or her smartphone 306C as her primary client device, she can establish a control session over office computer 306A via server 302 and share the application running on office computer 306A with Bob's 304B client devices 306D, 306E, and/or Carol's 304C client device 306F. Various embodiments for sharing resources on other client devices will be discussed in further detail below.

Figure 4:
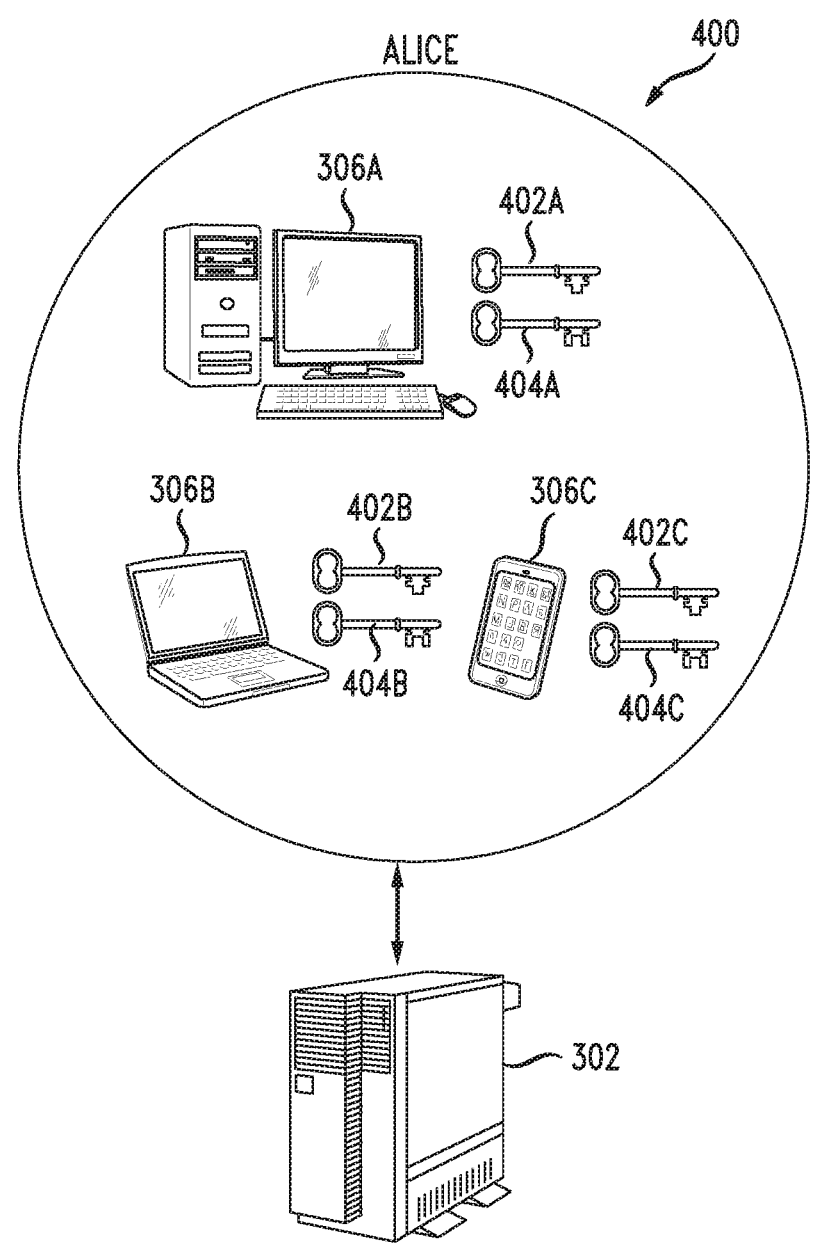
FIG. 4 illustrates generation of exemplary authentication keys.

FIG. 4 illustrates generation of exemplary authentication keys. Desktop computer 306A, laptop computer 306B, and smartphone 306C are exemplary client devices used by exemplary user Alice 304A, as illustrated in FIG. 3. In order for server 302 to authenticate the identities of user Alice 304A and/or any client device 306 that purports to belong to Alice 304A, server 302 may issue a key pair that consists of a public key and a private key to a trusted client device. Once issued a key pair, a client device may connect with server 302 to join an online meeting without having to provide a username and password. For example, user Alice 304A may log into server 302 from client device 306A using her username and password. After verifying the username and password, server 302 may issue public key 402A and private key 404A pair to client device 306A. Server 302 may also retain and store a copy of public key 402A and/or private key 404A that have been issued to client device 306A so that client device 306A can be later authenticated. Moreover, server 302 may associate the issued cryptographic keys 402A, 404A with user Alice 304A so that any client device that may purport to belong to user Alice 304A in the future can be properly authenticated.

Public key 402A and private key 404A may be mathematically linked such that ciphertext that has been encrypted with public key 402A may only be decrypted back into its counterpart plaintext with private key 404A. Although public key 402A and private key 404A are represented by images of physical keys in FIG. 4, one of skill in the art will understand that keys 402A, 404A are not physical keys, but rather data (i.e., numbers) that function like cryptographic keys.

When client device 306A attempts to log in to the meeting service, an identity server, such as server 302 or in the alternative a separate server, may identify client device 306A using a security token (i.e., digital signature). The security token can be a challenge response token such as a randomly generated number encrypted with public key 402A of client device 306A. In response to receiving the token, client device 306A may decrypt the challenge response token using its private key 404A and transmit the result back to server 302 for authentication. Server 302 may then compare the transmitted result with the original random value used in creating the token. When the two values coincide, then server 302 may determine that client device 306A is in possession of correct private key 404A, which implies that client device 306A is associated with Alice's 304A user account. Server 302 can register client device 306A for future reference and store the association between Alice 304A and client device 306A.

Similar to client device 306A and its cryptographic keys 402A, 404A, other client devices that belong to user Alice 304A such as client device 306B and client device 306B can be also registered with server 302. For instance, user Alice 304A may log into server 302 from client device 306B using her username and password. After verifying her username and password, server 302 can then issue public key 402B and private key 404B to client device 306B. In the alternative, Alice 304A may register client device 306B with server 302 using public key 402A, which has been previously issued to another client device 306A. Since server 302 already has knowledge of public key 402A as being associated with user Alice 304A, server 302 can trust the request to add client device 306A as a new device of Alice 304A. In a similar manner, Alice 304A can also add client device 306C to the online meeting session. Server 302 may issue public key 402C and private key 404C to client device 306C. In some embodiments, server 302 may issue identical key pairs to each of Alice's 304A client devices 306. In other words, public keys 402A, 402B, 402C may be identical keys. Similarly, private keys 404A, 404B, 404C may be identical private keys. Alternatively, key pairs issued to different client devices 306 may be unique to their devices. Thus, public key 402A may be different from public key 402B, and public key 402C may be different from both public key 402A and public key 402B. In addition, private keys 404A, 404B, 404C may be all different from each other. In such embodiments, server 302 may be able uniquely identify client devices 306 by their corresponding keys. Server 302 can also store information about which key pair(s) are associated with a given user.

Furthermore, server 302 may authenticate client devices 306 using the key pairs when an active client device attempts to establish itself as a new primary client device. For example, if, after Alice 304A uses her laptop computer 306B as the primary computer, moves over to her smartphone 306C and tries to establish it as the new primary client device, server 302 can use the public key that is associated with Alice 304A, such as public key 402B, to generate a challenge response token. Smartphone 306C may already possess identical public key 402C and its matching private key 404C. Once newly active client device 306C proves to server 302 that it possesses matching private key 404C by presenting a decrypted plaintext using private key 404C, server 302 can designate smartphone 306C as Alice's 304A new primary client device. Consequently, laptop computer 306B, which was Alice's 304A previous primary client device, may now be designated as a secondary client device, which can be subsequently controlled by primary client device 306C.

In some embodiments, server 302 may use the key pair when establishing control sessions and sharing various resources as well. In other embodiments, any or all of the commands that are issued through the control session can be encrypted and decrypted using the key pair. For example, primary client device 306C may encrypt, using public key 402A, a command for secondary client device 306A to share a resource with another user's device. After receiving the encrypted command, client device 306A can decrypted the message using private key 404A, thus assuring that no unauthorized client device (without the proper private key) may intercept the message and impersonate a legitimate secondary client device. In yet other embodiments, the media stream associated with sharing of resources may be encrypted with the key pair.

Figure 5A:
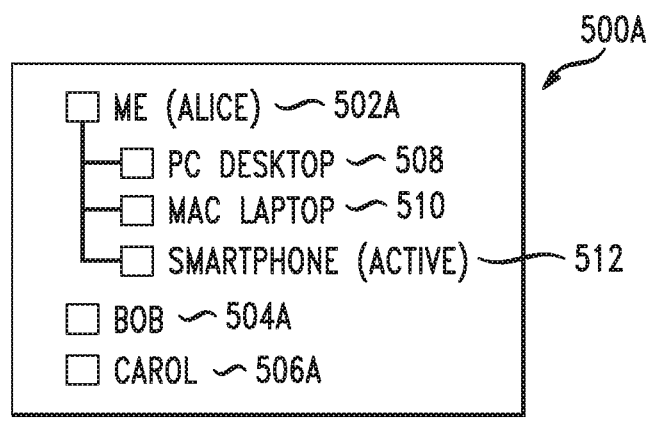
FIGS. 5A-5C illustrate exemplary participant rosters as displayed on the devices.
Figure 5B:
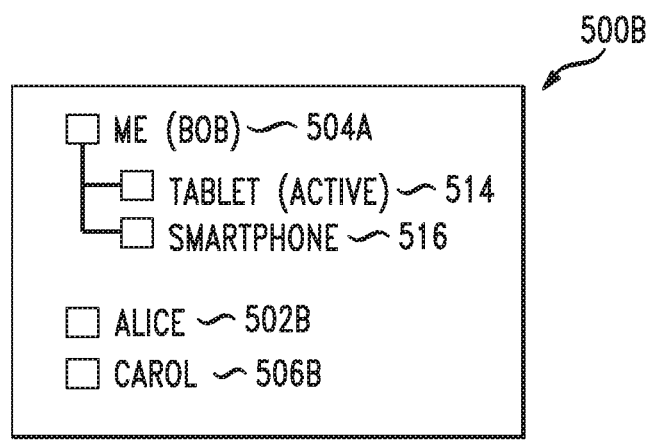
Figure 5C:
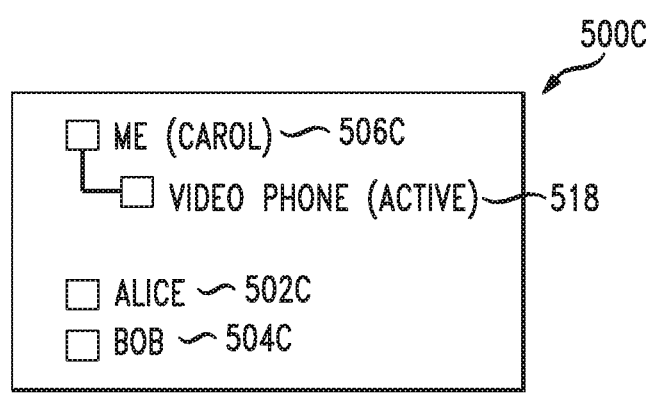

FIGS. 5A-5C illustrate exemplary participant rosters as displayed on the devices. Specifically, FIG. 5A shows exemplary meeting participant roster 500A as may be seen by the user (i.e., Alice 304A) on client device 306C of FIG. 3 via the user interface of the device. In this example, roster 500A indicates that there are three potential participants, as indicated by the corresponding labels 502A, 504A, 506A, in an ongoing online meeting. In some embodiments, presence indicators accompanying the names of the participants may indicate whether one or more of the users are present and currently available for interaction. In this example, client devices that are connected to server 302 under Alice's 304A user account are also listed under her name 502A as "PC DESKTOP" 508, "MAC LAPTOP" 510, and "SMARTPHONE" 512. Smartphone 306C is indicated as the active device (i.e., primary device). The presence indicators for the individual client devices may also inform user Alice 304A of the current statuses of those devices (e.g., online, offline). In some embodiments, the device names can be collapsible by a user input such as a mouse click on user label 502A.

The contents of roster 500A may change dynamically as the status of the users or client devices changes. For example, if user Bob 304B goes offline or idle for more than a threshold amount of time, his user label 504A may disappear or otherwise change its appearance (e.g., gray out). Alternatively, his presence indicator may identify him as being absent or away from the meeting. Furthermore, when another client device, such as client device 306B, becomes the new active device (i.e., primary device), device labels 510, 512 may be updated to reflect the devices' new statuses. For example, device label 510 may read, "MAC LAPTOP (ACTIVE)," while device label 512 may simply read, "SMARTPHONE," without the "(ACTIVE)" designation.

In some embodiments, client devices that belong to anyone else may be hidden from view in roster 500A. Doing so may advantageously simplify Alice's 304A interaction with Bob 304B or Carol 304C because Alice 304A no longer needs to worry about which of the multiple client devices belonging to another user to engage. Moreover, a greater level of privacy may be ensured for Bob 304B and Carol 304C because information pertaining to their client devices or the users' whereabouts is not shared with Alice 304A. For example, since participant roster 500A is shown on client device 306C belonging to Alice 304A, Bob's 304B client devices 306D, 306E do not need to show up in roster 500A. For similar reasons, roster 500A may not identify the individual client device(s) 306F belonging to Carol 304C. In other embodiments, however, participant roster 500A, as shown to Alice 304A, may still include information (not shown in FIG. 5A) about the individual client devices belonging to other users Bob 304B and Carol 304C.

In FIG. 5B, exemplary roster 500B, as may be shown to Bob 304B through client device 306D, is depicted in substantially similar ways as roster 500A of FIG. 5A. That is to say, the viewing user's name is displayed as "ME (BOB)" 504A along with his client devices 514, 516. Bob's tablet device 306D is marked as "(ACTIVE)" 514. On the other hand, no client devices belonging to Alice 304A or Carol 304C are individually identified in roster 500B.

By the same token, FIG. 5C illustrates exemplary participant roster 500C, which may be seen by Carol 304C on her video phone 306F, in substantially similar manners as participant roster 500A of FIG. 5A. Here, the viewing user's name is displayed as "ME (CAROL)" 506C along with her client device 518. Carol's only client device 306F is marked as "(ACTIVE)" 518. On the other hand, client devices belonging to Alice 304A or Bob 304B are not individually identified in roster 500C.

Figure 6:
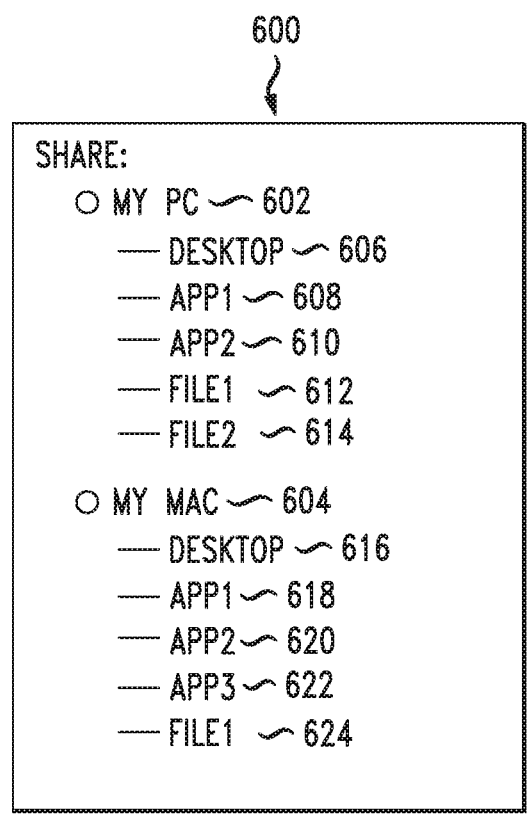
FIG. 6 illustrates an example of a user interface for sharing a resource.

FIG. 6 illustrates an example of a user interface for sharing a resource. In particular, exemplary user interface 600 represents a user menu that may be displayed on Alice's 304A active client device, which is her smartphone 306C in this example. In some embodiments, user interface 600 may allow user 304A to issue a command to share one or more resources from her secondary client devices 306A, 306B with other participants in the online meeting. In other embodiments, user interface 600 may additionally let user 304A to share one or more resources from her primary client device 306C as well. User interface 600 can be a dialog box, a pop-up, a menu, a list, etc. A user may interact with user interface 600 by using various types of input devices such as a mouse, a keyboard, a keypad, a stylus, a touchscreen, a remote controller, a motion capture device, speech, etc. In other embodiments, user interface 600 can be a non-graphic user interface such as a voice recognition system or an intelligent personal assistant.

User 304A can interact with user interface 600 to issue a command to share one or more resources 602-624 that are available on her client devices with one or more participants in the online meeting. The resources available for sharing can be organized by the names of the client devices that those resources are available on. For instance in this example, under MY PC 602, resources such as DESKTOP 606, APP1 (608), AP2 (610), FILE1 (612), and FILE2 (614) are displayed to the user. Similarly, under MY MAC 604, resources such as DESKTOP 616, APP1 (618), APP2 (620), APP3 (622), and FILE1 (624) are shown as being available for sharing.

Prior to choosing a resource 602-624 to share by user 304A, user interface 600 may present user 304A with options (not shown) to establish a control session with another one of her client devices first, such as client device 306A or client device 306B. Once the control session is established, the list of available resources (600) may be generated based on the information supplied by the corresponding client devices. For example, client device 306C may request to client devices 306A, 306B for lists of available resources on the respective devices that may be shared. In response, client device 306A and client device 306B may each transmit the list of available resources (e.g., DESKTOP, APP1, APP2, FILE1, FILE2) to client device 306, which then combine the lists into a master resource list such as the one shown on user interface 600. User interface 600 can also present user 304A with options (now shown) to specify to which user(s) the selected resource(s) are to be shared. For example, user 304A may choose to share APP3 (622) on MY MAC 604 with user Bob 304B, but not with user Carol 304C.

Figure 7:
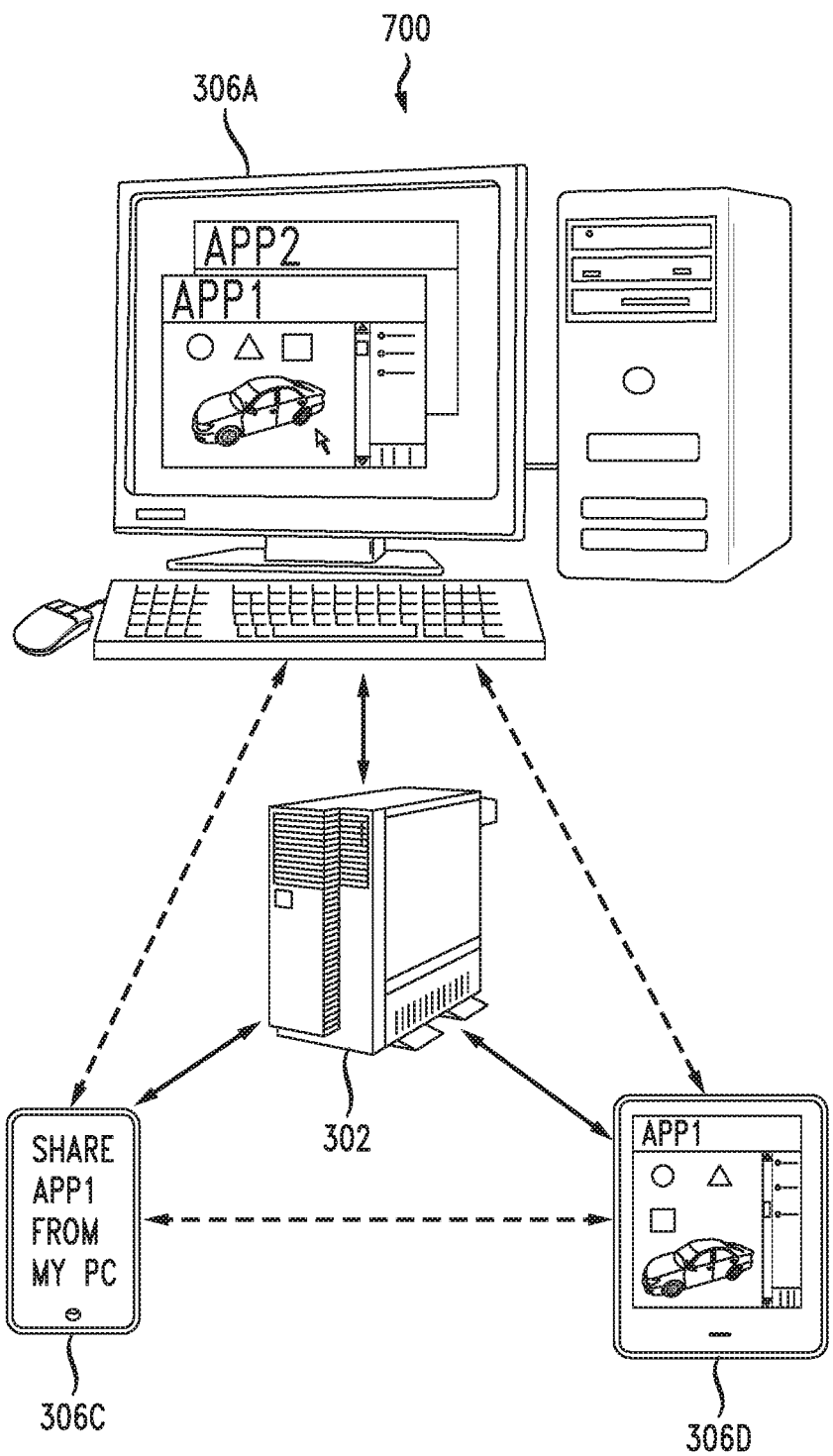
FIG. 7 illustrates an example of resource sharing among devices.

FIG. 7 illustrates an example of resource sharing among devices. Continuing from the examples illustrated in FIGS. 5A and 6, user Alice 304A issues a command on her smartphone 306C to share APP1 from her PC 306A. Prior to issuing the command, a control session might have been already established by her primary client device 306C over her secondary client device 306A. In some aspects, smartphone 306C can send the command signal to server 302, which then forwards the signal to desktop PC 306A. In other aspects, the command can be sent directly to PC 306A without having to traverse server 302. Upon receiving the signal, desktop computer 306A may initiate sharing the selected resource (i.e., APP1) with client device 306D, which belongs to user Bob 304B. The resource may be shared with other client devices simultaneously. For example, the resource may be shared with client device 306E (not shown), client device 306F (not shown), client device 306B, and/or even client device 306C (not shown), which issued the command to share the resource.

The resource may be shared in the form of streaming media data, control signals, or the combination of both. The streaming media data can be encoded to reduce the size of the data being transmitted. Additionally, the resource data may be encrypted so that only authorized client devices may decrypt the data. The resource may be shared via server 302 or directly with client device 306D via point-to-point communication. When client device 306A shares the resource with more than one client devices, client device 306A may transmit the resource data (e.g., media stream) via multicast transmission. Alternatively, client device 306A can transmit the resource data to server 302, which then distributes the data to other client devices via multicast. The resource data being shared may be manipulated, modified, and/or repackaged in order to meet the technical requirements of each receiving client device. In other words, when a resource from one client device is shared with another client device, the resource may have to be adjusted in order for the receiving client to properly present the resource to its user. Thus, depending on the screen size, screen resolution, screen aspect ratio, processing power, network bandwidth, functionality, etc. of the receiving device, the resource may need to be converted, transformed, truncated, augmented, or compartmentalized. Such adjustments can be made by client device 306A before transmitting the resource data, by server 302 before distributing the resource data to receiving client devices, or by client device 306D after receiving the resource data.

In the example illustrated in FIG. 7, desktop computer 306A may be equipped with a display device with a higher resolution and a wider aspect ratio than the display screen of tablet device 306D. Thus, in this example, when APP1 is displayed on tablet device 306D, some changes have been made to its presentation. For example, the icon layout is altered to facilitate the vertical orientation of the display screen. The sizes and proportions of the menu items may be also adjusted to fit the new screen. In addition, the mouse pointer may be removed in a touchscreen-based device such as tablet 306D. Finally, APP1 can be maximized to full screen mode on client device 306D. In other examples, when a text is shared with a client device with no display screen, the text can be converted into audio and played back through a speaker. In another example, when a video clip is shared with a client device with no audio playback capability, the sound in the video clip can be converted into text and overlaid on top of the video as closed caption. In yet another example, a large color image file can be encoded, truncated, or converted to black-and-white before it can be shared with a smaller device with limited storage space or processing power such as a non-smartphone cellular phone.

Figure 8:
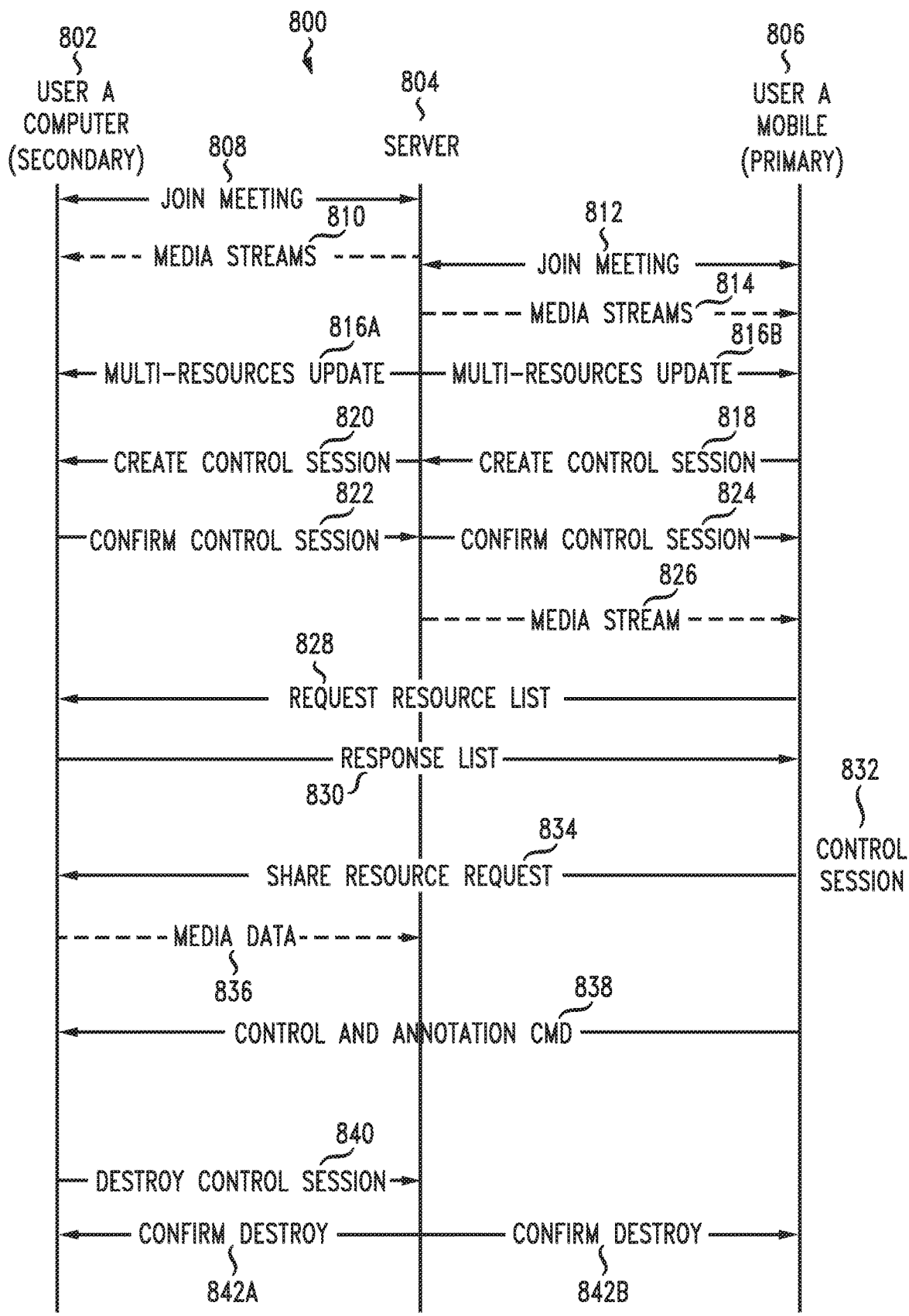
FIG. 8 illustrates an example sequence diagram for sharing resources among devices.

FIG. 8 illustrates an example sequence diagram for sharing resources among devices. In this exemplary scenario for sharing resources (800), we have User A's secondary client device 802, central server 804, and User A's primary client device 806. Although the example scenario 800 identifies the primary device as a mobile device and the secondary device as a computer, one of skill in the art will appreciate that those designations can be reversed. In this example scenario 800, User A's computer 802 first joins the meeting by connecting to server 804 (808). Server 804 may authenticate User A's computer 802 by verifying the username and password provided by the user or issuing a challenge response token using the public key that is linked to the user's user account. Once server 804 successfully verifies that the user behind computer 802 is indeed a legitimate user and/or that computer 802 is a trusted device, server 804 may allow computer 802 to join the meeting. In addition, server 802 may designate computer 802 as the primary device (i.e., active device). Now that User A's computer 802 is fully joined to the meeting, server 804 may now transmit media streams 810 to User A's computer 802. Media streams 810 can be, for instance, aggregated audio, video, and/or text data generated based on the audio, video and/or text data feeds received from other participants in the meeting. Alternatively, other client devices may transmit their individual media streams to User A's computer 802 directly via point-to-point communication. Although media streams 810 is depicted as being transmitted at one specific time in FIG. 8, one of skill in the art will understand that the transmission of media streams 810 may occur over an extended period of time in real time during the online meeting.

Without leaving the online meeting from computer 802, User A may choose to join the meeting for the second time from her mobile device 806. Similar to the join meeting process 808 for computer 802, User A's mobile device 806 may also attempt to join the meeting by using a username and password or a key pair with server 804 (812). After determining that mobile device 806 is the new active device (because the recent join meeting process 812 was presumably initiated by the user), server 804 may automatically designate the new active device (i.e., mobile device 806) as the new primary device. Alternatively, server 804 may wait until a control session is established to change the primary device designation, as will be discussed in detail below. Once successfully authenticated, mobile device 806 can start receiving media streams 814 from server 804. Similar to media streams 810, mobile device 806 may also receive media streams 814 throughout the online meeting.

By this time, server 804 may realize that more than one client device (i.e., computer 802 and mobile device 806) from the same user is currently logged into the meeting. Server 804 may at this point send multi-resources updates 816A-B to computer 802 and mobile device 806. Multi-resources updates 816A-B may inform the respective client devices of the existence of the other client device(s). It may also provide additional information that would be necessary for one client device to identify and communicate with other client device(s) such as device identifiers, network addresses, preferred communications protocol(s), etc. Additionally, presence information, activity indications, primary/secondary device designations may be also shared through multi-resource updates 816A-B. Server 804 may issue multi-resource updates 816A-B to the client devices on a regular basis according to a predetermined schedule or dynamically whenever a relevant event occurs such as a new client device joining the meeting or an existing client device leaving the meeting.

User A may wish to share from her mobile device 806 one or more resources residing on her computer 802. Server 804 may require that User A first establish a control session between mobile device 806 and computer 802. In order to establish the session, mobile device 806 can first send a request to server 804 to create a control session (818). Server 804 may then forward this request to computer 802 (820). Optionally, before forwarding the request to computer 802, server 804 may first authenticate mobile device 806 or the request message itself to ensure that mobile device 806 is authorized to create a control session over computer 802. In some embodiments the request to create a control session can be sent from mobile device 806 directly to computer 802. Upon receiving the request, computer 802 can send a confirmation message to server 804 (822). Before sending the confirmation, computer 802 may try to authenticate the request message first to determine whether the request comes from a legitimate client device. In some embodiments, computer 802 can be configured to accept the create control session request automatically. In other embodiments, computer 802 can be configured to accept the request only with User A's confirmation. The confirmation message may be forwarded to mobile device 806 via server 804 (824), or the message may be transmitted directly to mobile 806 without going through server 804.

Once the control session is established between computer 802 and mobile 806, server 804 may designate mobile device as the primary client device, if it has not already done so. Consequently, computer 802 can be designated as a secondary client device that can be controlled by the primary device. Primary client device 806 may now assume partial or full control over secondary client device 802. In some embodiments, once the control session is established, no data (i.e., media data) need be transported between primary client device 806 and secondary client device 802. In such embodiments, the amount of data exchanged between primary device 806 and secondary device(s) 802 can be drastically reduced because only control signals need to be exchanged between the devices.

Additional media streams 826 may be transmitted from server 804 to primary client device 806. In some aspects, server 804 may send media stream 826, which may contain meeting data and control signals, only to primary client device 806. This helps alleviate the amount of network traffic that travels between server 804 and the multiple client devices 802, 806, and advantageously reduce the server 804 workload. In such embodiments, since it is assumed that User A is actively using primary device 806 only, secondary client device 802 need not receive media stream 826. If User A chooses to move over to computer 802 at a later time and establish it as the primary client device, then server 804 could transmit media stream 826 only to computer 802 and not to mobile device 806 anymore. In some embodiments, however, server 804 may continue to broadcast media stream 826 to every client device regardless of whether it is a primary client device or a secondary client device.

Primary client device 806 may request a resource list from secondary client device 802 (828). The resource list may contain a list of items on secondary client device 802 that primary client device 806 may request for sharing. For example, the resource list can be a list of applications on secondary client device 802 that may be shared. The resource list may also include any files (e.g., a video, an audio, a text, a slideshow, a document, etc.) or the entire desktop/system environment itself. In some embodiments, primary client device 806 may send the request to server 804 to be forwarded to secondary client device 802. In other embodiments, primary client device 806 may send the request directly to secondary client device 802 without the help of server 804. In some aspects, the request for the resource list is sent out by primary client device 806 automatically and without knowledge of User A. In other aspects, User A can explicitly make the request through primary client device 806 to retrieve the list from secondary client device 802.

Once secondary device 802 receives the request, the device may gather information about its sharable resources and send the compiled list back to primary device 806, either via server 804 or directly to primary device 806 (830). Primary device 806 may then use the list to populate its user interface so that User A may be able to identify which resources on secondary client device 802 are available for sharing. If there are more than one secondary client device that primary client device 806 has established control sessions with, primary device 806 can combine the resource lists that it received from multiple secondary client devices to create a consolidated resource list such as resource list 600 shown in FIG. 6. The resource list can be periodically updated so that primary client device 806 could have up-to-date information about the sharable resources on secondary client device(s) 802. Alternatively, the resource list can be updated only when User A manually initiates the update process.

Once the resource list is populated, User A may now issue a command to share a resource from secondary client device 802 (834). The request may specify which resource is to be shared, for how long, with which user or client device, with what type of privilege (e.g., for viewing only, partially interactive, fully interactive, etc.), and other specifications. The request may be sent directly to computer 802 to reduce network traffic between client devices and server 804. In the alternative, the request may be sent to secondary device 802 via server 804. Upon receiving the request to share one or more resources, secondary client device 802 transmits media data 836 that represents the shared resource to server 804. Server 804 may then distribute media data 836 to its intended recipients such as other client devices belonging to users other than User A. In some embodiments, server 804 may also distribute resource media data 836 to User A's primary client device 806 or User A's other secondary client device(s).

Since User A can have full control over the shared resource on secondary client device 802 from her primary client device 806, after the transmission of media data 836 or anytime during the transmission of media data 836, primary client device 806 may send one or more control and/or annotation commands to computer 802, either directly or via server 804 (838). For example, while sharing a slideshow stored on computer 802, User A may want to issue a command to move to the next slide. User A can also highlight some of the phrases on the slide with a highlight tool. These control and annotation commands can be sent from primary client device 806 to secondary client device 802, which can then apply these commands to the appropriate resources. It may appear to other users as if User A is directly controlling secondary device 802 when in fact User A is physically manipulating her primary client device 806 only. Accordingly, subsequent media data 836 may reflect any changes that have been made to the shared resource(s) by such commands. In some embodiments, depending on sharing privileges assigned to the other meeting participants, server 804 may receive control and/or annotation commands from those meeting participants other than User A. For example, in FIG. 7, user Bob 304B may manipulate APP1 from his tablet device 306D. Tablet device 306D can then issue the associated control or annotation commands directly to desktop computer 306A, or to server 302, which may then forward the commands to desktop computer 306A. Desktop computer 306A can then apply those commands to APP1 and transmit the resulting media stream to server 302 for playback at tablet device 306D.

Once the resource sharing is complete, the control session can be terminated. In some embodiments, the user can initiate the destruction of the control session. In other embodiments, a client device can initiate the destruction process, for instance, when there are no more requests to share a resource (i.e. idle control session) for more than a threshold amount of time. In example scenario 800, computer 802 sends a request to server 804 to destroy the previously established control session with mobile device 806 (840). Likewise, mobile device 806 can also send the request to destroy the control session. Upon receiving the request, server 804 may then destroy the control session and send out confirmation messages 842A-B. After control session is over, primary client device 806 can no longer control secondary client device 802.

Figure 9:
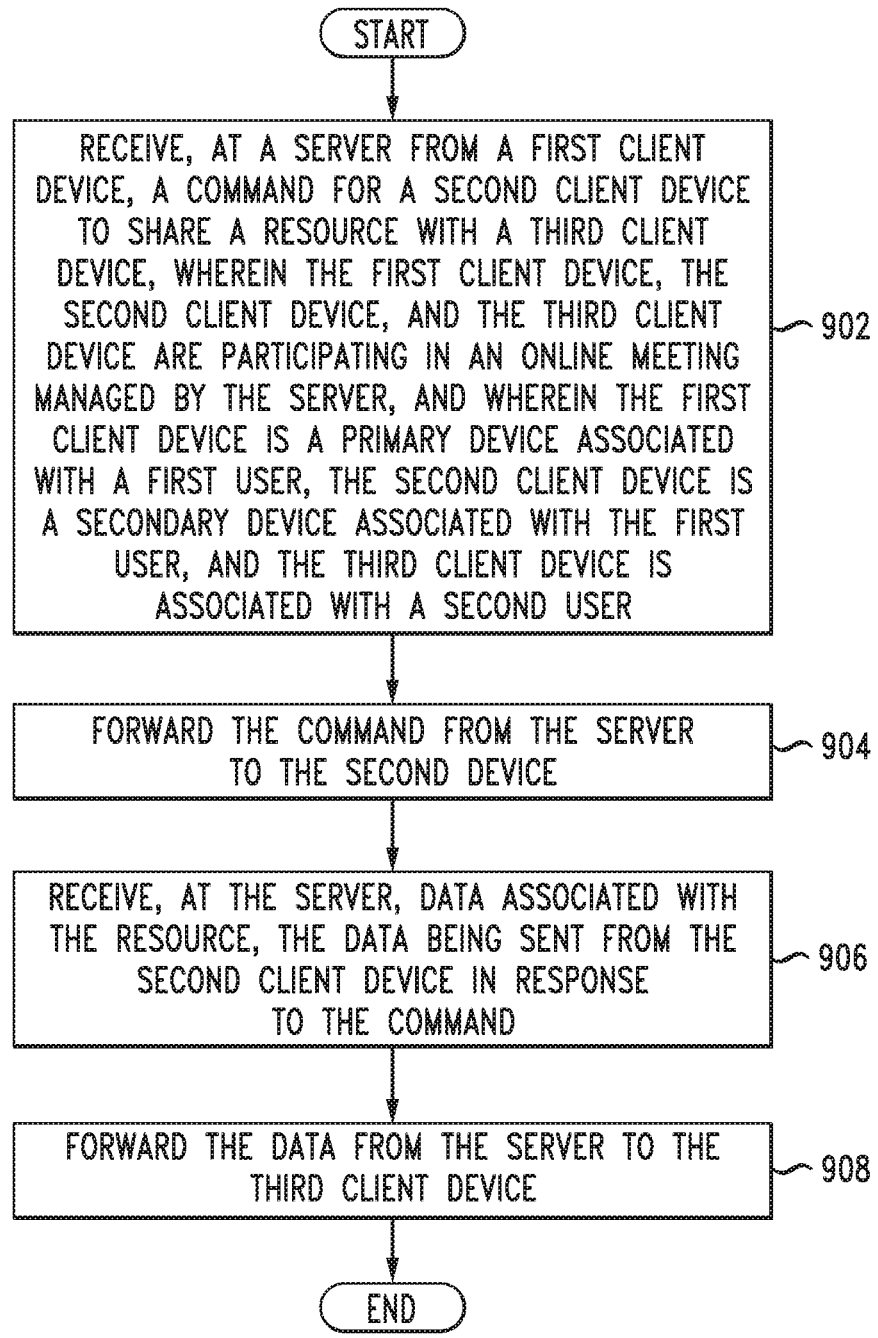
FIG. 9 illustrates an example method for sharing a resource in an online meeting.
Figure 10:
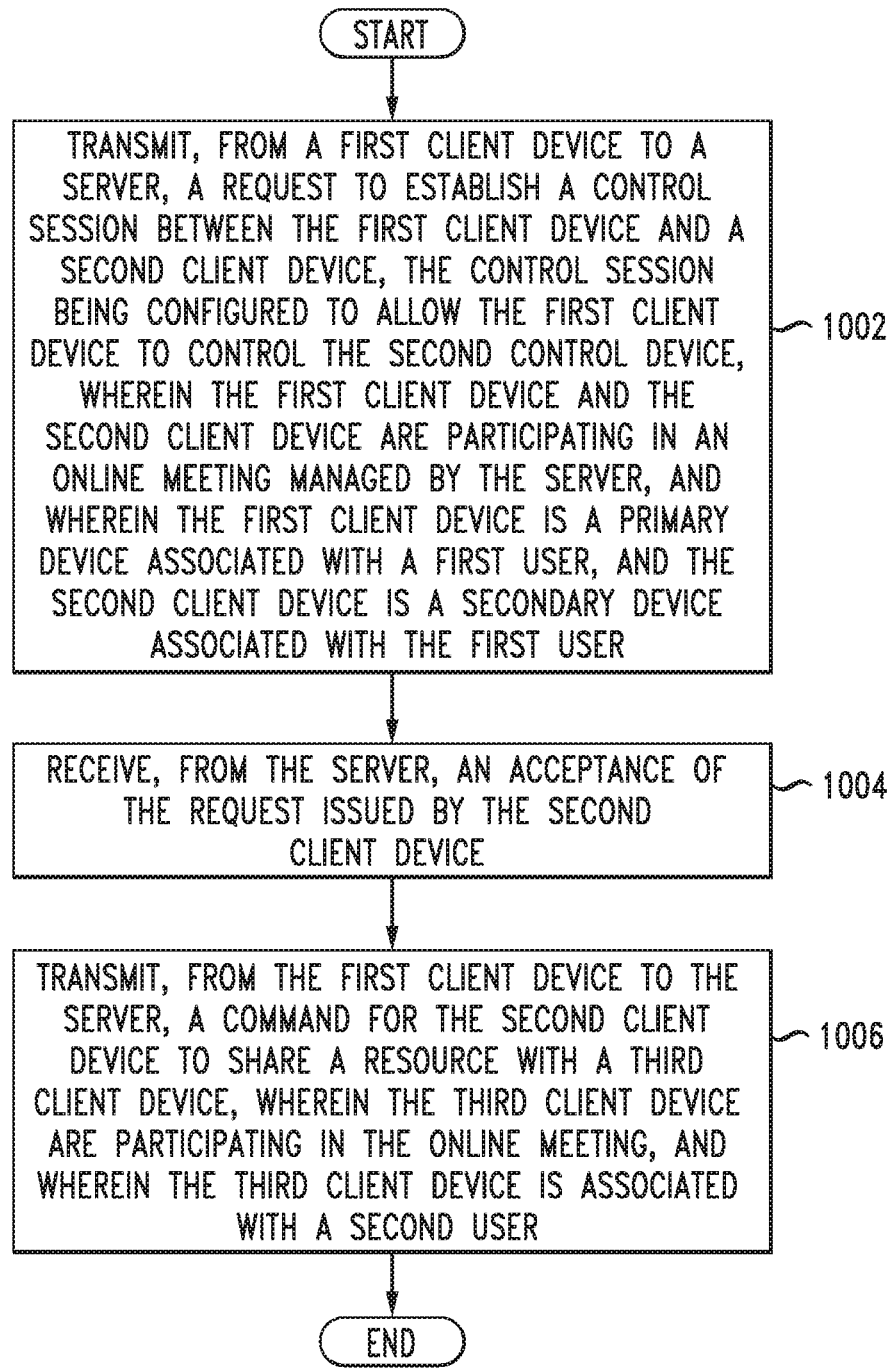
FIG. 10 illustrates another example method for sharing a resource in an online meeting.
Figure 11:
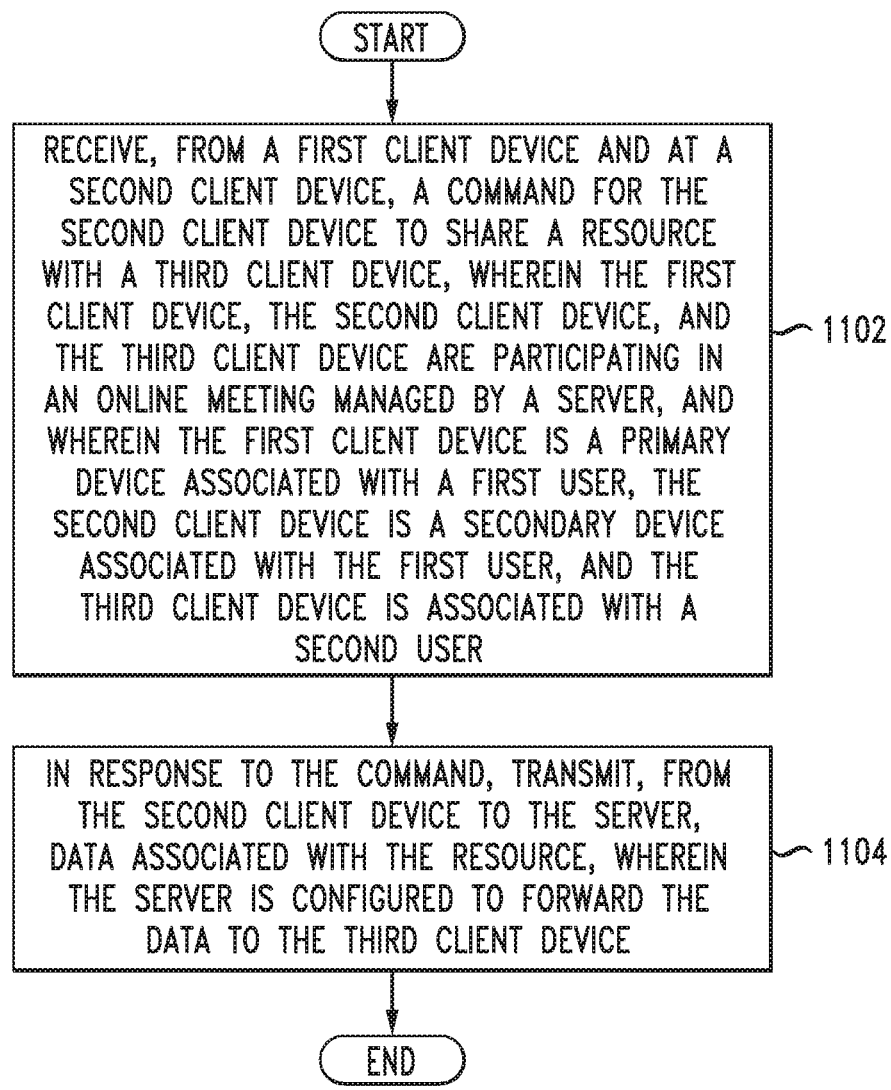
FIG. 11 illustrates yet another example method for sharing a resource in an online meeting.

Having disclosed some basic system components and concepts, the disclosure now turns to some exemplary method embodiments shown in FIGS. 9-11. For the sake of clarity, the methods are discussed in terms of an example system 200, as shown in FIG. 2, configured to practice the methods. Alternatively, the methods can be practiced by network device 100, as shown in FIG. 1. It is understood that the steps outlined herein are provided for the purpose of illustrating certain embodiments of the subject technology, but that other combinations thereof, including combinations that exclude, add, or modify certain steps, may be used.

FIG. 9 illustrates an example method for sharing a resource in an online meeting. In this exemplary method, system 200 can be a server. In practice, system 200 can receive, at a server from a first client device, a command for a second client device to share a resource with a third client device, wherein the first client device, the second client device, and the third client device are participating in an online meeting managed by the server, and wherein the first client device is a primary device associated with a first user, the second client device is a secondary device associated with the first user, and the third client device is associated with a second user (902). The first client device, the second client device, and the third client device can each be a computer, a desktop computer, a laptop computer, a tablet device, a telephone, a voice over Internet protocol telephone, a smartphone, or a mobile device. The resource can be an application, a desktop environment, a system environment, a file, a document, a video, an audio, and/or a text. The first client device and the second client device may be associated with the same user account. Alternatively, the devices can be associated with two separate user accounts belonging to the same user (i.e., the first user).

Prior to receiving the command, system 200 may have received from the first client device a request to establish a control session with the second client device. System 200 may forward the request to the second client device and receive from the second client device, an acceptance of the request. The acceptance may have been issued by the second client device based on a confirmation from the first user. In the alternative, the acceptance, may have been issued by the second client device without a confirmation from the first user. Once the acceptance is received, a control session may be established between the first client device and the second client device, wherein the control session is configured to allow the first client device to control the second control device. Upon authenticating the first client device, system 200 may designate the first client device as the primary device associated with the first user. Authenticating the first client device can be accomplished by receiving a digital signature created by the first client device using a private key associated with the first client device, and determining, using a public key associated with the first client device, whether the digital signature was created by the first client device.

Additionally, system 200 may receive, from the first client device, a request for a list of one or more resources that are available on the second client device for sharing. system 200 may forward the request to the second client device and receive from the second client device the list of one or more resources. Finally, system 200 may forward the list of one or more resources to the first client device, wherein the resource is chosen based on the list of one or more resources.

After system 200 receives the command to share the resource, system 200 can forward the command from the server to the second device (904). System 200 can receive, at the server, data associated with the resource, the data being sent from the second client device in response to the command (906). System 200 can then forward the data from the server to the third client device (908). The third client device may be configured to present, to the second user via a user interface on the third client device, only one client device that is associated with the first user. In other words, instead of seeing both the first client device and the second client device, the second user may be able to see one of the two client devices, a new virtual client device, or no client devices at all. Additionally, system 200 can also forward the data from the server to the first client device.

System 200 may receive a data stream from the third client device, the data stream being addressed to the first user, wherein the data stream is not specifically addressed to the first client device or the second client device. Since the first and second client devices may be hidden from the view of the second user, the data stream coming from the third client device may not be addressed specifically to either one of the two devices. Instead, the data stream can be addressed to the first user or the user account(s) associated with the first user. The data stream may be a video stream, an audio stream, a text, or any combination thereof. In some embodiments, system 200 may forward the data stream only to the primary device. In other embodiments, system 200 may forward the data stream also to the secondary device.

At any time, system 200 may receive, from the second client device, a request to designate the second client device as the primary device associated with the first user. This may happen when the first user decides to use the second client device as the active device. Upon authenticating the second client device, system 200 can designate the second client device as the primary device associated with the first user, and designate the first client device as the secondary device associated with the first user.

FIG. 10 illustrates another example method for sharing a resource in an online meeting. In this exemplary method, system 200 can be a controlling client device. System 200 may transmit, from a first client device to a server, a request to establish a control session between the first client device and a second client device, the control session being configured to allow the first client device to control the second control device, wherein the first client device and the second client device are participating in an online meeting managed by the server, and wherein the first client device is a primary device associated with a first user, and the second client device is a secondary device associated with the first user (1002). System 200 may then receive, from the server, an acceptance of the request issued by the second client device (1004). Next, system may transmit, from the first client device to the server, a command for the second client device to share a resource with a third client device, wherein the third client device are participating in the online meeting, and wherein the third client device is associated with a second user (1006). In addition, prior to transmitting the command, system 200 may transmit, from the first client device to the server, a request for a list of one or more resources that are available on the second client device for sharing, and receive from the second client device the list of one or more resources, wherein the resource is selected based on the list of one or more resources.

FIG. 11 illustrates yet another example method for sharing a resource in an online meeting. In this exemplary method embodiment, system 200 can be the controlled client device. System 200 may receive, from a first client device and at a second client device, a command for the second client device to share a resource with a third client device, wherein the first client device, the second client device, and the third client device are participating in an online meeting managed by a server, and wherein the first client device is a primary device associated with a first user, the second client device is a secondary device associated with the first user, and the third client device is associated with a second user (1102). In response to the command, system 200 may transmit, from the second client device to the server, data associated with the resource, wherein the server is configured to forward the data to the third client device (1104). Optionally, prior to receiving the command to share the resource, system 200 may receive a request from the first client device to establish a control session between the first client device and the second client device, the control session being configured to allow the first client device to control the second control device. System 200 may then transmit, to the first client device, a confirmation message accepting the request.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A method comprising:
  conducting an online meeting with active participants including a first client device, a second client device, and a third client device, the first client device being a primary device associated with a first user, the second client device being a primary device associated with a second user, and the third client device is a secondary device associated with the second user; and
  presenting, during the online meeting to the first user via a user interface on the first client device, only one client device of the second and third client devices that is associated with the second user;

wherein the second and third client devices are active participants to the online meeting, but the first client device reflects that participation by only showing participation by one of the second and third client devices.

2. The method of claim 1, wherein each of the first client device, the second client device, and the third client device is one of a computer, a desktop computer, a laptop computer, a tablet device, a telephone, a voice over Internet protocol telephone, a smartphone, or a mobile device.

3. The method of claim 1, wherein the second and third client devices are associated with a same user account of the second user.

4. The method of claim 1, wherein the second and third client devices are associated with different user accounts of the second user.

5. The method of claim 1, further comprising:
receiving a data stream from the third client device, the data stream being addressed to the first user, wherein the data stream is not specifically addressed to the first client device or the second client device; and
forwarding the data stream to the second client device.

6. A non-transitory computer readable media storing instructions which when executed cause a system to perform operations comprising:
conducting an online meeting with active participants including a first client device, a second client device, and a third client device, the first client device being a primary device associated with a first user, the second client device being a primary device associated with a second user, and the third client device is a secondary device associated with the second user; and
presenting, during the online meeting to the first user via a user interface on the first client device, only one client device of the second and third client devices that is associated with the second user;
wherein the second and third client devices are active participants to the online meeting, but the first client device reflects that participation by only showing participation by one of the second and third client devices.

7. The non-transitory computer readable media of claim 6, wherein each of the first client device, the second client device, and the third client device is one of a computer, a desktop computer, a laptop computer, a tablet device, a telephone, a voice over Internet protocol telephone, a smartphone, or a mobile device.

8. The non-transitory computer readable media of claim 6, wherein the second and third client devices are associated with a same user account of the second user.

9. The non-transitory computer readable media of claim 6, wherein the second and third client devices are associated with different user accounts of the second user.

10. The non-transitory computer readable media of claim 6, further comprising:
receiving a data stream from the third client device, the data stream being addressed to the first user, wherein the data stream is not specifically addressed to the first client device or the second client device; and
forwarding the data stream to the second client device.

11. A system comprising:
a processor;
a non-transitory computer readable memory storing instructions programmed to cooperate with the processor to before operations comprising:
conducting an online meeting with active participants including a first client device, a second client device, and a third client device, the first client device being a primary device associated with a first user, the second client device being a primary device associated with a second user, and the third client device is a secondary device associated with the second user; and
presenting, during the online meeting to the first user via a user interface on the first client device, only one client device of the second and third client devices that is associated with the second user;
wherein the second and third client devices are active participants to the online meeting, but the first client device reflects that participation by only showing participation by one of the second and third client devices.

12. The system of claim 11, wherein each of the first client device, the second client device, and the third client device is one of a computer, a desktop computer, a laptop computer, a tablet device, a telephone, a voice over Internet protocol telephone, a smartphone, or a mobile device.

13. The system of claim 11, wherein the second and third client devices are associated with a same user account of the second user.

14. The system of claim 11, wherein the second and third client devices are associated with different user accounts of the second user.

15. The system of claim 11, further comprising:
receiving a data stream from the third client device, the data stream being addressed to the first user, wherein the data stream is not specifically addressed to the first client device or the second client device; and
forwarding the data stream to the second client device.

* * * * *